US012675525B2

(12) United States Patent
Doken et al.

(10) Patent No.: US 12,675,525 B2
(45) Date of Patent: Jul. 7, 2026

(54) SYSTEMS AND METHODS FOR PROVIDING SUPPLEMENTAL CONTENT BASED ON A MEME

(71) Applicant: Adeia Guides Inc., San Jose, CA (US)

(72) Inventors: Serhad Doken, Bryn Mawr, PA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/618,714

(22) Filed: Mar. 27, 2024

(65) Prior Publication Data

US 2025/0307880 A1      Oct. 2, 2025

(51) Int. Cl.
| | |
|---|---|
| *G06Q 30/02* | (2023.01) |
| *G06F 16/532* | (2019.01) |
| *G06F 16/55* | (2019.01) |
| *G06Q 30/0204* | (2023.01) |
| *G06Q 30/0241* | (2023.01) |

(52) U.S. Cl.
CPC ....... *G06Q 30/0276* (2013.01); *G06F 16/532* (2019.01); *G06F 16/55* (2019.01); *G06Q 30/0205* (2013.01)

(58) Field of Classification Search
CPC ............ G06Q 30/0276; G06Q 30/0205; G06F 16/532; G06F 16/55
See application file for complete search history.

(56) References Cited

U.S. PATENT DOCUMENTS

| | | | |
|---|---|---|---|
| 9,552,442 B2 | 1/2017 | Hill et al. | |
| 11,562,147 B2 | 1/2023 | Wang et al. | |
| 2009/0192896 A1* | 7/2009 | Newton | G06Q 30/0224 |
| | | | 707/999.107 |
| 2012/0102021 A1* | 4/2012 | Hill | G06F 16/9535 |
| | | | 707/711 |
| 2014/0279906 A1 | 9/2014 | Peintner | |
| 2016/0080476 A1* | 3/2016 | Sandell | H04L 67/10 |
| | | | 709/204 |
| 2021/0264193 A1* | 8/2021 | Harris | G06V 20/46 |

(Continued)

OTHER PUBLICATIONS

"Automatic Discovery of Meme Genres with Diverse Appearances" (Theisen, William et al., published 2021 at the proceedings of the Fifteenth International AAAI Conference on Web and Social Media (ICWSM 2021)) (Year: 2021).*

(Continued)

*Primary Examiner* — James M Detweiler
(74) *Attorney, Agent, or Firm* — HG LAW LLP

(57) ABSTRACT

Systems and methods are described for leveraging various computer-implemented techniques and/or data structures of memes, including root memes and their associated variants, to selectively provide supplemental content to a user using a computing device at which a meme is identified for presentation. The disclosed techniques may generate the supplemental content based on data associated with a plurality of memes, wherein the data may be indicative of at least one category associated with visual content of the respective memes. The disclosed methods may identify supplemental content related to the category of the meme. The disclosed techniques may cause the supplemental content to be provided for presentation in the vicinity of the meme at the display of the computing device.

20 Claims, 19 Drawing Sheets

(56) References Cited

U.S. PATENT DOCUMENTS

| | | | |
|---|---|---|---|
| 2022/0138514 A1* | 5/2022 | Hall | G06V 30/42 |
| | | | 382/224 |
| 2022/0165050 A1 | 5/2022 | Harris et al. | |
| 2022/0328075 A1 | 10/2022 | Chandrashekar et al. | |
| 2024/0404159 A1* | 12/2024 | Ledoux | G06T 3/18 |

OTHER PUBLICATIONS

"Computer Vision and Internet Meme Genealogy: An Evaluation of Image Feature Matching as a Technique for Pattern Detection" (Courtois, Cedric & Frissen, Thomas. (2022). Communication Methods and Measures. 17. 1-23. 10.1080/19312458.2022. 2122423) (Year: 2022).*

"Meme Ads Guide: The Power of Memes in Marketing Campaigns" (Gangwani, Sumita, published online Feb. 28, 2021 at https://nogood. io/2021/02/28/meme-ads/) (Year: 2021).*

Josh Constine, "Facebook Data Scientists Prove Memes Mutate And Adapt Like DNA", (TechCrunch Jan. 8, 2014), (https:// techcrunch.com/2014/01/08/facebook-memes/).

Lada A. Adamic, et al., "Information Evolution in Social Networks", (Submitted on Feb. 27, 2014), (https://arxiv.org/abs/1402. 6792).

University of Michigan, Facebook memes can evolve like genes:, (Jan. 16, 2014), (https://news.umich.edu/facebook-memes-can-evolve-like-genes/).

\* cited by examiner

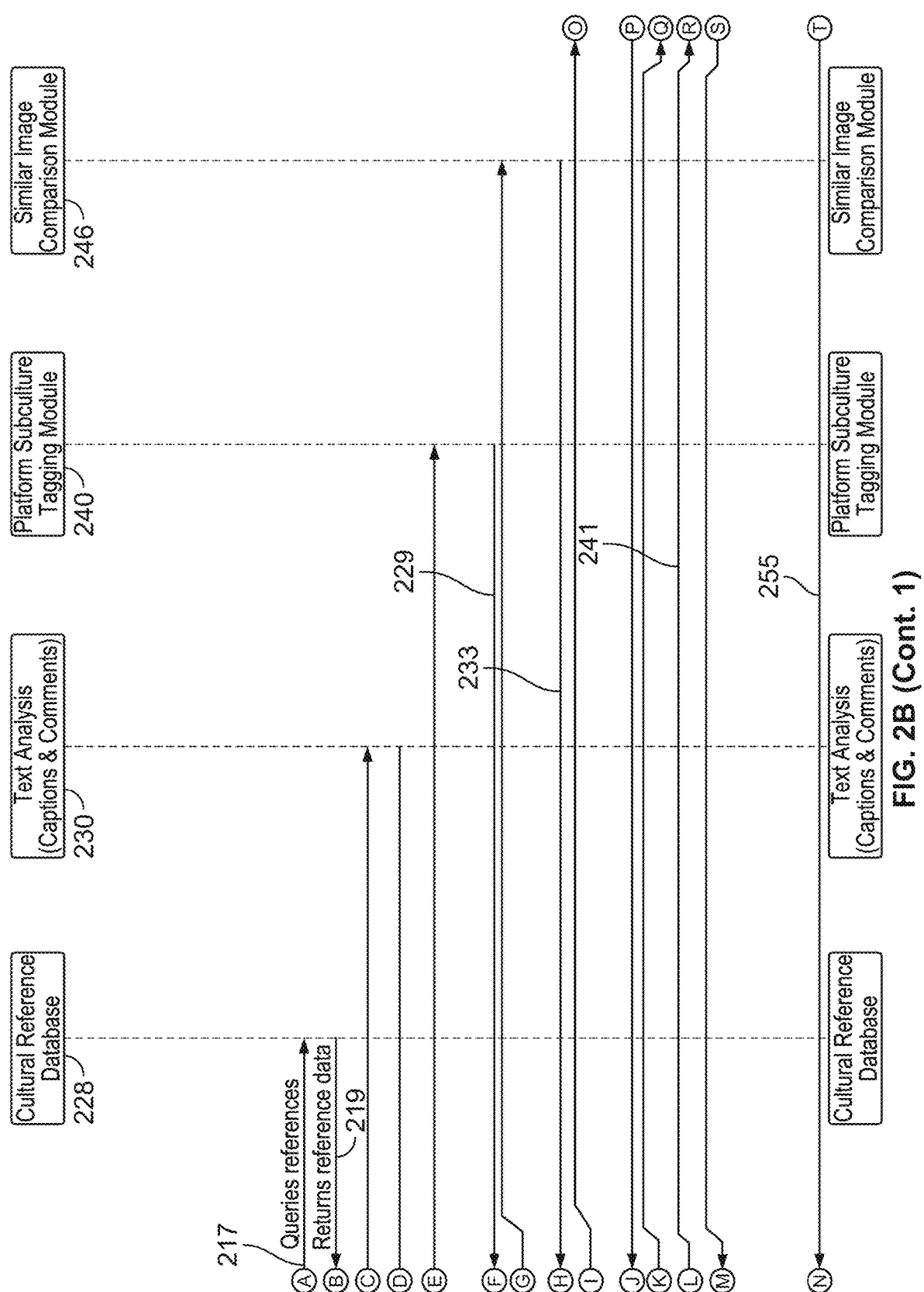
FIG. 2B (Cont. 1)

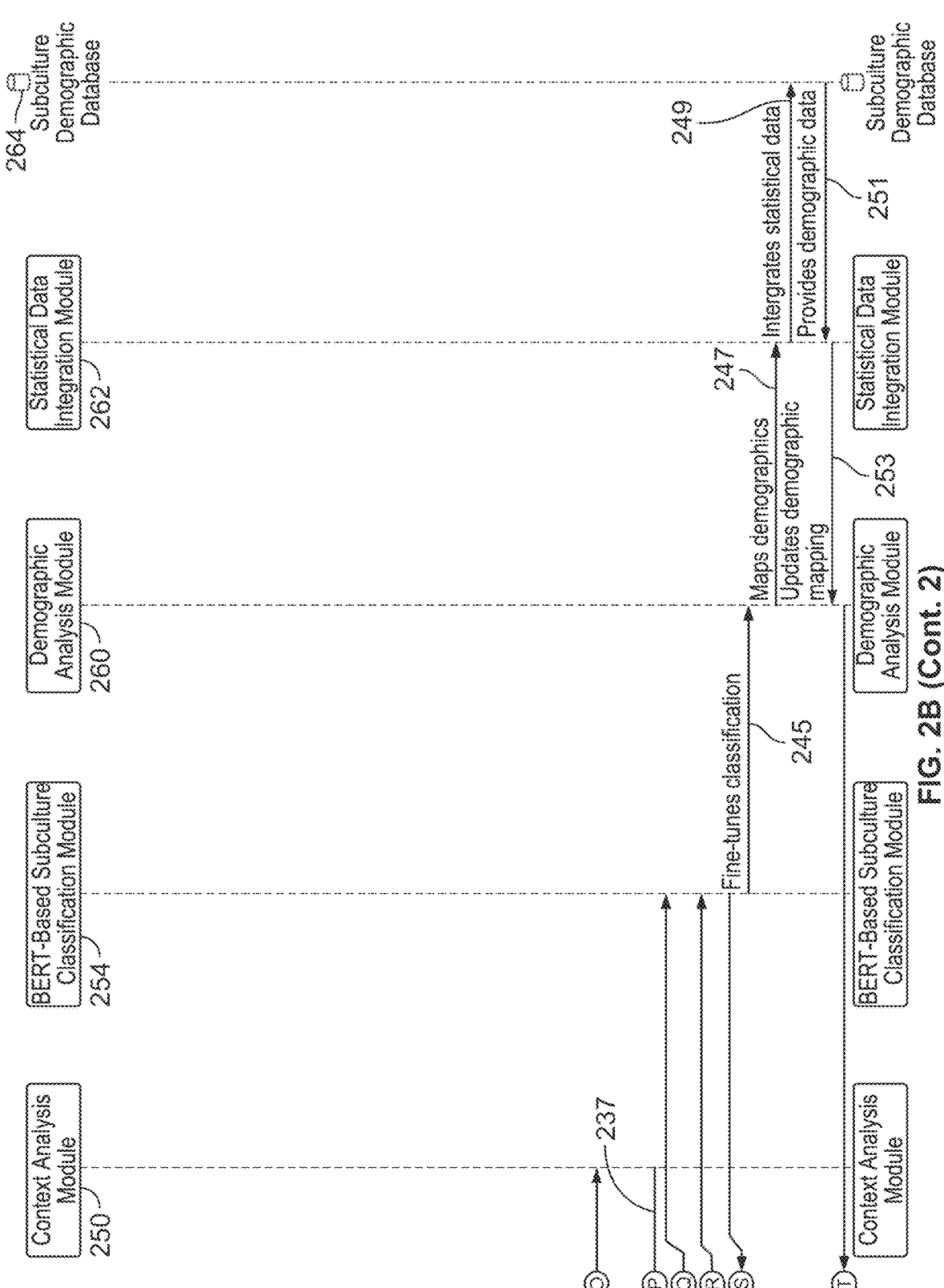
FIG. 2B (Cont. 2)

400

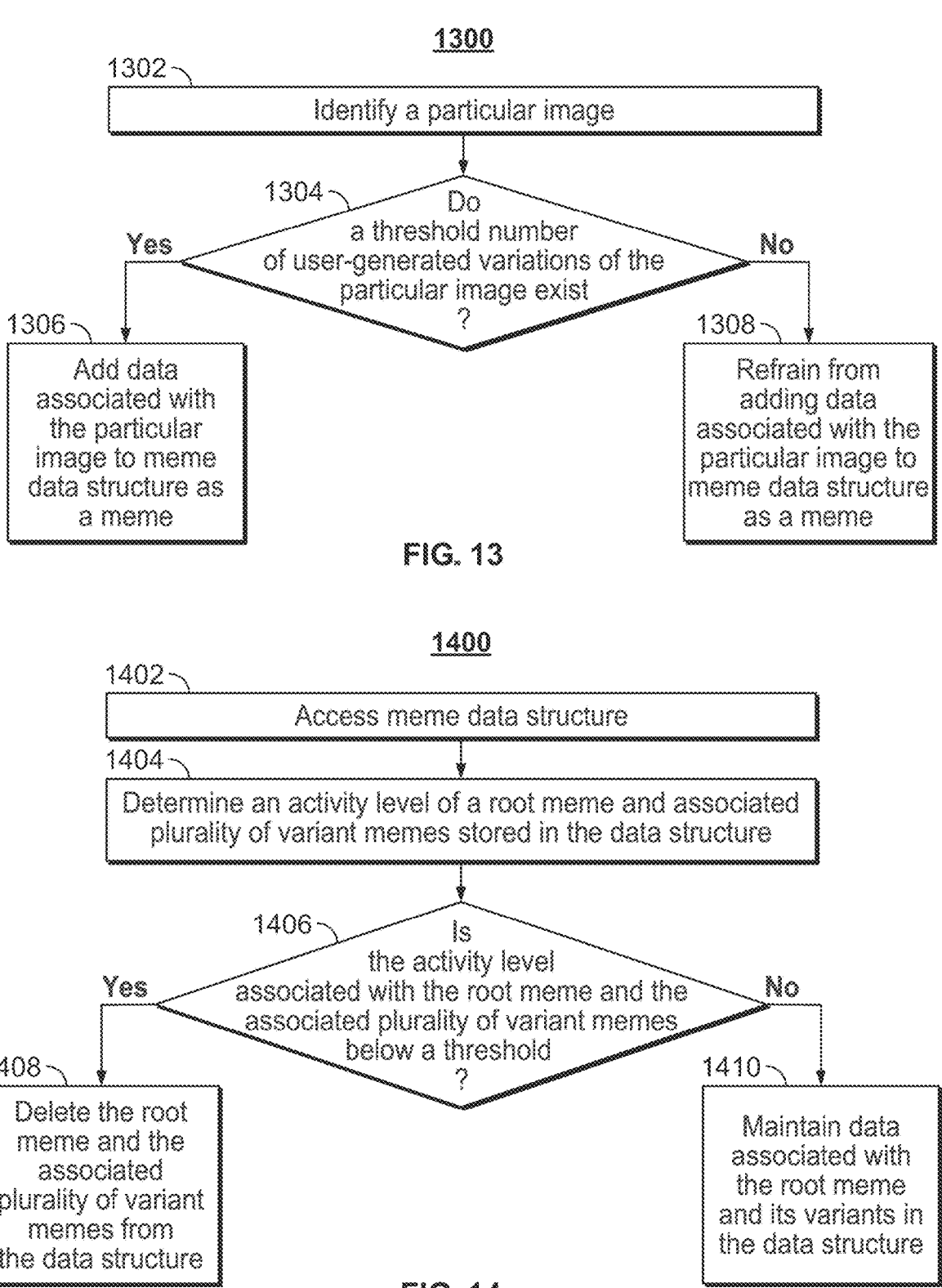

1300

1302 — Identify a particular image

1304 — Do a threshold number of user-generated variations of the particular image exist?

Yes

No

1306 — Add data associated with the particular image to meme data structure as a meme 1308 — Refrain from adding data associated with the particular image to meme data structure as a meme

1402 — Access meme data structure

1404 — Determine an activity level of a root meme and associated plurality of variant memes stored in the data structure 1406 — Is the activity level associated with the root meme and the associated plurality of variant memes below a threshold?

Yes

No

1408 — Delete the root meme and the associated plurality of variant memes from the data structure 1410 — Maintain data associated with the root meme and its variants in the data structure

FIG. 14

SYSTEMS AND METHODS FOR PROVIDING SUPPLEMENTAL CONTENT BASED ON A MEME

BACKGROUND

This disclosure is directed to systems and methods for providing supplemental content related to a meme identified for presentation. For instance, the supplemental content may relate to a category associated with visual content of the meme, and may be provided (e.g., for display with the meme) based on a popularity associated with the meme.

SUMMARY

It is common, often through social media platforms, for memes to be transmitted and shared via the Internet. Memes are a cultural item that have become viral on social networking websites, and memes often cover topical matters such as current affairs, politics, and popular culture. Memes posted on social media websites rapidly spread to multiple users and often times evolve to include different variants of the originally posted meme. Memes are a form of cultural expression that typically go beyond simple text, incorporating various elements that make them distinctive and shareable. For example, memes often include visual elements such as images, photos, or graphics, which can convey a message, emotion, or context in a way that plain text cannot, and such visual elements are frequently combined with text to create humor or commentary. Other viral content, such as news, often does not have the same impact of memes due to the meme's mutation capability as well as a sense of community often fostered by memes.

Further, modern media distribution systems enable a user to access more media content than ever before, and on more devices than ever before. Media content may include supplemental content or interactive content, related to the media content, which may enhance the user experience and allow users to better interact or engage with the media content. In an approach, a content provider provides supplemental content to a user based on a webpage that the user is visiting being related to the supplemental content. For instance, if a user is visiting a sports webpage, a notification or advertisement regarding an upcoming sports game may be presented to the user. However, in such approach, a popularity of content on the webpage that the user is visiting is not taken into account when determining whether to provide the supplemental content. In other words, the content provider may be inefficiently using finite computing and/or network resources to transmit supplemental content that is not of interest to the user and/or that is not generally popular to users. Moreover, there is a lack of tools available for efficiently and effectively providing, to a user that is viewing a meme, supplemental content related to such meme based on a popularity, context, subject matter, and/or category of the meme.

Given the virality of memes and how many users are exposed to memes, it would be desirable for content providers to leverage memes in a variety of ways, such as by providing to users supplemental content that relates to a meme that a user is currently viewing. However, given the sheer number of memes available on the Internet and/or via other networks, for a meme that is currently being displayed to a user, it may be difficult to, in real time, recognize that content on the web page is a meme, determine a type of content included in the meme, determine whether the meme is relevant to this specific user (and/or to users more generally), and use this data to identify (and determine whether to present) other memes and/or other supplemental content related to the content type of the meme. What would be helpful are techniques for effectively and efficiently correlating a current meme to existing memes, to enable a content provider to provide useful supplemental data that is likely to be of interest to the user and that is related to the meme.

Accordingly, to help address such problems, systems and methods are disclosed herein for identifying a first meme for presentation at a display of a computing device. The disclosed systems and methods provide for querying a data structure comprising data associated with a plurality of memes, wherein the plurality of memes comprise a plurality of root memes, each respective root meme of the plurality of root memes being associated with a plurality of variant memes being variations of the respective root meme, and wherein the data indicates, for each respective meme of the plurality of memes, at least one category, of a plurality of categories, associated with visual content of the respective meme. Based on querying the data structure, the disclosed techniques may determine that visual content of the first meme corresponds to visual content of a second meme of the plurality of memes associated with the data stored in the data structure. The disclosed techniques may determine, based at least in part on a number of variant memes associated with the second meme in the data structure, whether a popularity of the second meme exceeds a threshold. In response to determining that the popularity of the second meme exceeds the threshold, the disclosed techniques may identify supplemental content related to a category, of the plurality of categories, of the first meme and the second meme, and cause the supplemental content to be provided for presentation in a vicinity of the first meme at the display of the computing device. It should be noted that "based on" and "based at least in part on" are used interchangeably herein, and that as used herein, performing a particular action or function (or obtaining an attribute or result) "based on" or "based at least in part on" a particular criterion is not intended to limit such action, function, attribute, or result to be performed or obtained solely on the basis of such particular criterion.

Such aspects may enable content providers to leverage various computer-implemented techniques (e.g., machine learning models) and/or data structures of memes, including root memes and their associated variants, to selectively provide supplemental content to a user using a computing device at which a meme is being displayed. For example, supplemental content may be provided only if the supplemental content is relevant to the meme (determined based on mapping a visual content category of such meme to one or more similar memes having a similar visual content category as indicated in the data structure) and/or only if the meme (and the supplemental content) is likely to be relevant or popular to the user, and/or to users more generally. This enables conserving the computing and/or networking resources of supplemental content providers, by having supplemental content, in relation to a meme, be provided for display with such meme if certain conditions are met, e.g., indicating the meme and supplemental content are likely of interest to the user.

In some embodiments, determining that the visual content of the first meme corresponds to the visual content of a second meme associated with the data stored in the data structure further comprises determining that the first meme is a variant meme of the second meme.

In some embodiments, a particular image and images associated with the particular image are added to the data structure as a root meme and variant memes, respectively, based on determining that the images associated with the particular image correspond to at least a threshold number of user-generated variations of the particular image. By selectively adding only certain content to the data structure that has a certain number of user-generated variations, the system can help conserve storage resources, by avoiding using storage space for images that may not be relevant to most users and/or that otherwise may not qualify as memes.

In some embodiments, the disclosed techniques may determine a particular variant meme for a particular root meme stored in the data structure by identifying a modified version of the particular root meme having a modification to at least one visual element of the particular root meme; calculating a similarity score between the particular root meme and the modified version of the meme; in response to determining that the similarity score is above a threshold, determining that the modified version of the particular root meme is a variant meme of the particular root meme; and storing the particular variant meme in the data structure in association with the particular root meme. By calculating a similarity metric between the meme and the modified version of the meme and comparing the similarity metric to a threshold, the system can conserve storage resources, by avoiding using storage space on content that may not be sufficiently similar to a root meme so as to be considered a variant thereof.

In some embodiments, the data structure comprises a graph data structure, and a distance between a particular root meme and a particular variant meme of the plurality of memes in the graph data structure is indicative of a degree of similarity between a category of the particular root meme and a category of the particular variant meme. In some embodiments, the graph data structure comprises a plurality of graph data structures, and wherein each respective category of the plurality of categories is associated with a respective graph data structure of the plurality of graph data structures that is organized based at least in part on popularities of memes associated with the respective category. In some embodiments, identifying the supplemental content related to the category, of the plurality of categories, of the first meme, and causing the supplemental content to be provided for presentation in the vicinity of the first meme at the display of the computing device, are further performed based at least in part on a distance between the graph data structure for the category of the first meme and one or more other graph data structures, in the plurality of graph data structures, for one or more other categories of memes.

In some embodiments, the disclosed techniques may comprise receiving an indication (e.g., from a supplemental content provider) that the supplemental content should not be provided in association with a meme of a particular category, and causing the supplemental content to be provided for presentation in the vicinity of the first meme at the display of the computing device may be performed in response to determining that the category of the first meme does not correspond to the particular category.

In some embodiments, the disclosed techniques may comprise using a first machine learning model to obtain one or more natural language descriptions associated with the visual content of the first meme and using a second machine learning model to receive as input the one or more natural language descriptions and output data indicative of a particular category of the plurality of categories to which the visual content of the first meme belongs. In some embodiments, the disclosed techniques may comprise training the second machine learning model to learn a plurality of embeddings for tokens associated with indications of characteristics of a dataset of memes, wherein the characteristics of the dataset of memes are obtained using the first machine learning model. In some embodiments, the disclosed techniques may comprise determining that a particular embedding, of the plurality of embeddings, for a particular token is used by the second machine learning model to output data indicative of the particular category, and based on determining that the particular embedding for the particular token is used by the second machine learning model to output data indicative of the particular category, using the particular token to identify one or more variant memes for one or more root memes. In some embodiments, the disclosed techniques may comprise using the second machine learning model to determine that a third meme is a variant meme of the first meme and that the third meme belongs to a different category than the particular category of the first meme; identifying a characteristic of the third meme that caused the third meme to be classified as belonging to the different category; and assigning, in the second machine learning model, a relatively higher weighting in association with an embedding for a token corresponding to the characteristic of the third meme. Such techniques may avoid having to execute the full pipeline of machine learning models in certain instances, thereby conserving processing resources and facilitating faster real-time analysis of content and presentation of targeted supplemental content.

In some embodiments, the disclosed techniques may comprise identifying the supplemental content related to the category, of the plurality of categories, of the first meme by transmitting, to a server (e.g., a supplemental content provider), an indication of the category of the first meme; and receiving, from the server, the supplemental content, wherein the server identifies the supplemental content from among a plurality of supplemental content items based on determining that the supplemental content depicts an object having a characteristic that matches the category of the first meme.

In some embodiments, the disclosed techniques may comprise identifying a demographic group associated with the first meme; identifying preferences of a user of the computing device; determining, based on the preferences of the user, a particular demographic group, of a plurality of demographic groups, to which the user belongs; determining the particular demographic group of the user corresponds to the demographic group associated with the first meme; and causing the supplemental content to be provided for presentation in the vicinity of the first meme at the display of the computing device further in response to determining that the particular demographic group of the user corresponds to the demographic group associated with the first meme.

In some embodiments, the disclosed techniques may comprise determining that an activity level associated with the root meme and the associated plurality of variant memes is below a threshold; and in response to determining that activity associated with the root meme and the associated plurality of variant memes is below a threshold, deleting the root meme and the associated plurality of variant memes from the data structure. By deleting, from the data structure, certain memes that are less likely to be used in providing supplemental content to users, the system can help alleviate the burden of storing a vast number of memes and their associated variants available on the Internet, thereby conserving storage resources. In some embodiments, the data structure comprising data associated with the plurality of memes further comprises data indicative of an activity level associated with the plurality of memes.

In some embodiments, a first meme is being displayed via a social media platform, and the disclosed techniques may comprise, based on identifying a plurality of users of the social media platform having user preferences related to the category of first meme, causing the supplemental content to be provided for presentation in the vicinity of the first meme at the display of a plurality of computing devices of the plurality of users of the social media platform.

In some embodiments, the disclosed techniques may determine a user's degree of association with a category based on a distance between a particular root meme and a particular variant meme of the plurality of memes in the graph data structure. For example, as the strength of the meme (e.g., a subculture strength score) increases or decreases over time (e.g., as indicated in the data structure), the association of one or more platform users (e.g., associated with and/or that interacted with the meme) with such meme or subculture may similarly increase or decrease based on the increase or decrease of the strength of the meme and/or subculture thereof.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 13 is a flowchart of an illustrative process for updating a meme data structure, in accordance with some embodiments of this disclosure.

FIG. 14 is a flowchart of an illustrative process for managing a meme data structure, in accordance with some embodiments of this disclosure.

DETAILED DESCRIPTION

Figure 1:
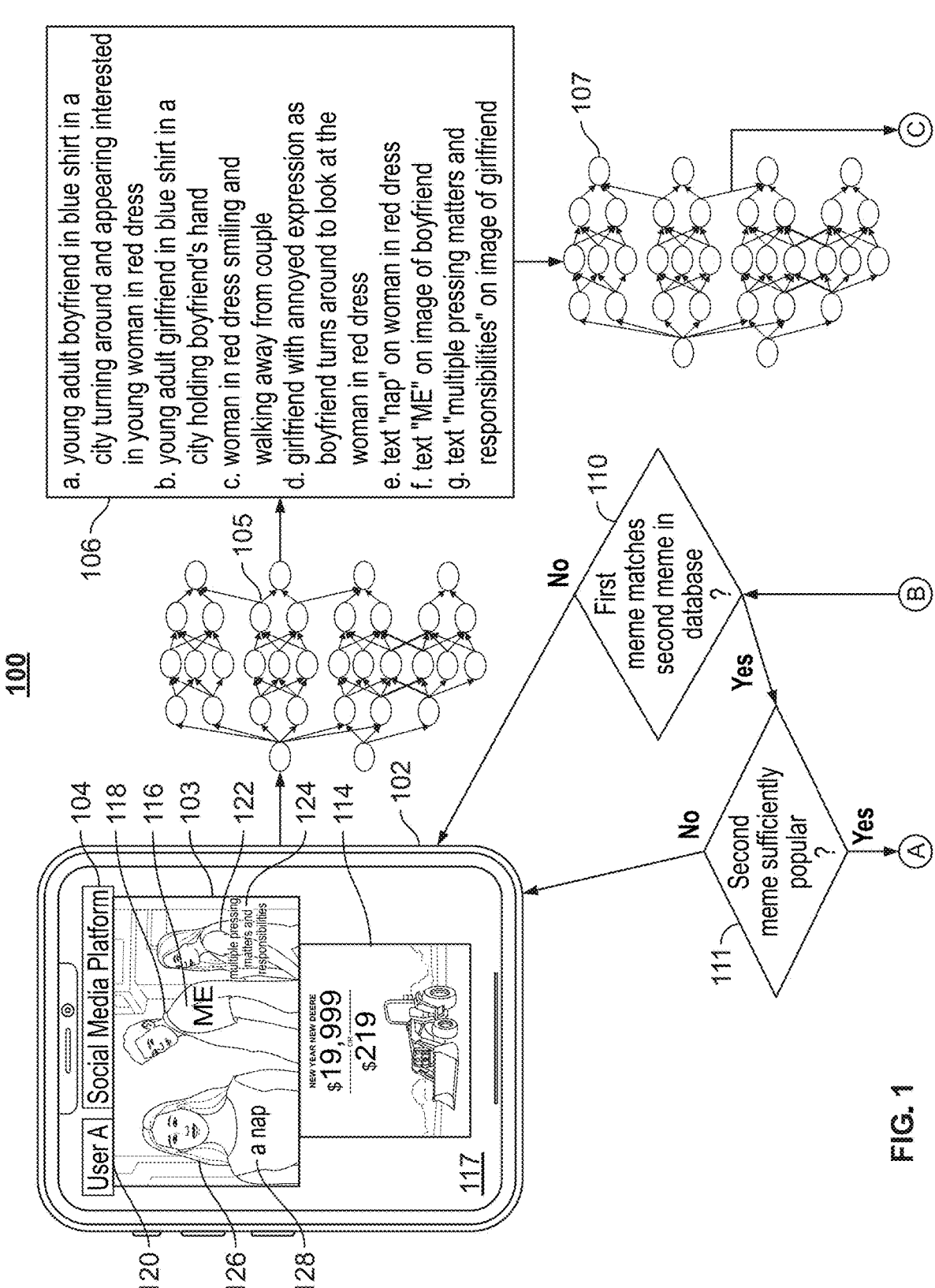
FIG. 1 shows an illustrative system for providing supplemental content that is relevant to a meme, in accordance with some embodiments of this disclosure.
Figure 1:
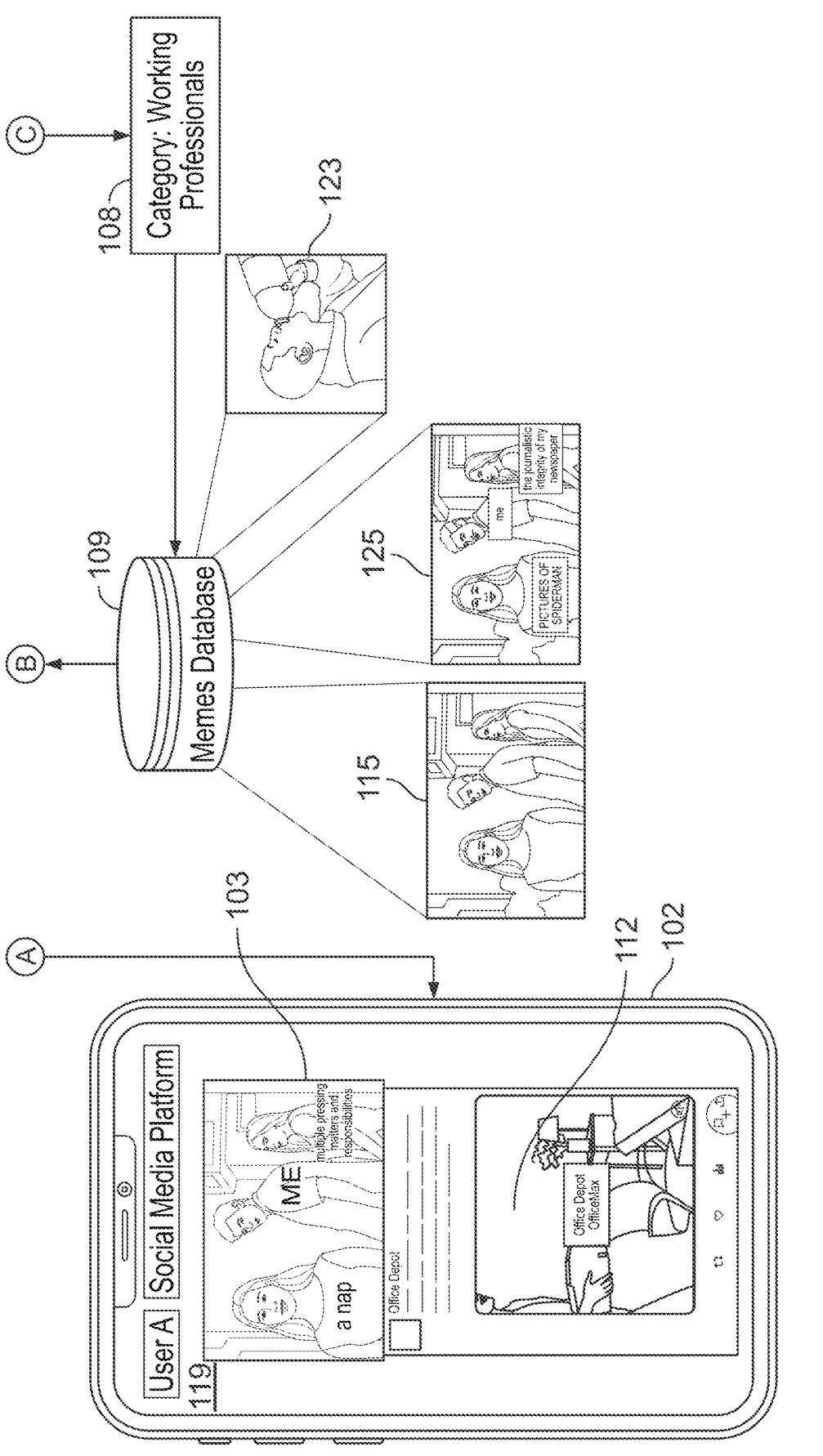

FIG. 1 shows an illustrative system 100 for providing supplemental content 112 that is relevant to meme 103, in accordance with some embodiments of this disclosure. In some embodiments, system 100 (referred to herein as "the system") may comprise or correspond to social media platform 104, a supplemental content (e.g., advertising) provider or distributor or creator, or any other suitable platform, or any combination thereof. The system may comprise or correspond to an application, which may be executed at least in part on computing device 102 and/or at one or more remote servers (e.g., server 1004 of FIG. 10 and/or media content source 1002 of FIG. 10) and/or at or distributed across any of one or more other suitable computing devices, in communication over any suitable number and/or types of networks (e.g., the Internet). The application may be configured to perform the functionalities (or any suitable portion of the functionalities) described herein. In some embodiments, the application and/or the system may be a standalone application, or may be incorporated as part of any suitable application or system, e.g., a content creation and/or content editing application; a web browsing application; a social media application; a content provider application; an extended reality (XR) application; a supplemental content provider; a content acquisition, recognition and/or processing application; a machine learning model or AI system; or any other suitable application or system; or any combination thereof. The application and/or system may comprise or employ any suitable number of displays; sensors or devices such as those described in FIGS. 1-14; or any other suitable software and/or hardware components; or any combination thereof.

In some embodiments, the application may be installed at or otherwise provided to a particular computing device, may be provided via an API, or may be provided as an add-on application to another platform or application. In some embodiments, software tools (e.g., one or more software development kits, or SDKs) may be provided to any suitable party, to enable the party to implement the functionalities described herein.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

As shown in FIG. 1, the system may enable a social media platform 104 to provide for display, at a computing device 102, a meme 103. As shown in FIG. 1, computing device 102 may be a mobile device such as, for example, a smartphone or tablet. In some embodiments, computing device 102 may comprise or correspond to a laptop computer, a personal computer, a desktop computer, a smart television, a smart watch or wearable device, smart glasses, a stereoscopic display, a wearable camera, XR glasses, XR goggles, a near-eye display device, or any other suitable user equipment or computing device, or any combination thereof.

A meme as referred to herein may be understood as content comprising image data (e.g., visual content), audio data, video data, textual data, and/or any other suitable data, or any combination thereof, which often has a cultural significance (e.g., idea, behavior or style) to one or more segments of the population, and which is spread via the Internet (or via any other suitable network or electronic communication mechanism), for example, through a social media or other messaging platforms. For example, memes may cover or refer to topical matters such as current affairs, politics, popular culture, historical events, or specific contexts that can resonate with a particular audience. In some instances, memes incorporate various elements that make the meme distinctive from other content that is not characterized as a meme. For example, some characteristics of a meme that may differentiate it from such other content may be visual content, variation, virality or popularity, inside jokes, relatable situations, cultural references, humor and satire, social and community aspects, brevity and concision, emotiveness, and/or context sensitivity (e.g., memes may rely on a specific context or reference, and their meaning can be deeply tied to that context, which often creates in-group/out-group dynamics among those who "get" the meme).

In some instances, memes tend to follow, for example, a particular format, style, or structure that is recognizable. However, while they share similarities, they also often incorporate variations that keep the meme fresh and relevant to different contexts. For example, memes are often remixed and adapted by individuals or communities, which contributes to their evolution, and such remixing allows memes to stay relevant and reflect changing cultural norms. As another example, memes are often part of online communities and subcultures, and they can carry meaning and shared experiences that are understood by members of these groups; Thus, they can create a sense of belonging and shared knowledge.

A subculture may be understood a distinct cultural group or community that exists within a larger culture and exhibits characteristics, values, norms, practices, and symbols that differentiate it from the dominant or mainstream culture. Subcultures typically emerge in response to shared interests, beliefs, or experiences of its members and can be based on various factors, including age, gender, ethnicity, hobbies, lifestyle choices, fashion, music, and more. Subcultures may provide advertisers with useful data points for targeting segments of a population. In some embodiments, visual content of a meme can include images, photos, text and/or graphics that convey a message, emotion, or context. For example, these visuals may be combined with text to create humor or commentary. Some memes have been generated just for the purpose of disseminating misinformation and conspiracy. Given the popularity of short-form video on social platforms today, the repetition feature of media plays directly into human psychology and enables many such videos etc. to go viral in a compressed timeframe.

For instance, meme 103 may be a variation of a root meme 115 stored in memes database 109. Database 109 may comprise data associated with any suitable number of root memes (e.g., root meme 115; meme 125, which is a variant meme of root meme 115; and root meme 123) and variant memes associated with each root meme. Root meme 115 is a well-known "Distracted Boyfriend" meme including a stock photograph featuring a man looking back at another woman while another woman by his side (perhaps his girlfriend) looks on disapprovingly. The "Distracted Boyfriend" meme 115 is often used to humorously depict situations where someone is distracted by something new and interesting while their current situation or commitment is being ignored. The subculture surrounding the "Distracted Boyfriend" meme primarily involves creative and humorous ways people adapt and remix the meme to fit various contexts. It has been widely shared on social media, and users have created many variations and parodies by superimposing different images or text over the original photograph to create jokes, commentary, and satirical content. It has become a popular format for memes, often used to comment on issues like relationships, infidelity, loyalty, and various other relatable situations.

Variant meme 103 may include the same visual elements as (or a subset of the visual elements of) root meme 115, such as, for example, a depiction of objects 118, 122, and 126 (e.g., a man and two women). However, unlike root meme 115, meme 103 may include text 116 (e.g., "ME") overlayed on object 118 or another suitable portion of a background (e.g., a city street), and/or text 124 (e.g., "multiple pressing matters and responsibilities") overlayed on object 122, and/or text 128 (e.g., "a nap") overlayed on object 126. It should be noted that while in this example root meme 115 does not include text, other root memes in memes database 109 may include text and/or visual content and/or any other suitable content. In some embodiments, meme 103 is currently being displayed to a user, such as, for example, "User A" 120 in FIG. 1 accessing social media platform 104, or is otherwise identified for display to user 120. For example, meme 103 may not yet be displayed but the system 100 may determine it is likely that meme 103 may be displayed upon receiving input from user 120, e.g., to continue scrolling through social media platform 104 or to select a particular icon or link.

In some embodiments, the system may be configured to employ any suitable computer-implemented technique (e.g., one or more machine learning models, and/or heuristic techniques) to perform visual processing (e.g., object recognition) of meme 103 to obtain one or more natural language descriptions 106 of one or more portions of meme 103. Natural language description(s) 106 may describe meme 103 as a whole, and/or any suitable portion(s) or subset(s) thereof, and/or may describe one or more objects present in meme 103. In some embodiments, natural language description(s) 106 may be stored in a data structure (e.g., a database, a knowledge graph or other graph data structure, a semantic map, or any other suitable data structure, or any combination thereof). In some embodiments, multiple natural language description(s) 106 may be obtained for meme 103 and stored in data structure 109. Natural language description 106 may include, for example, an objects' classification within meme 103; an objects' location, scale and relationships with other objects; other defining characteristics; and/or any other suitable data.

For example, natural language description 106 may include "Young adult boyfriend in blue shirt in a city turning around and appearing interested in young woman in red dress" referring to man 118 in meme 103; "Young adult girlfriend in blue shirt in a city holding boyfriend's hand" referring to woman 122 and man 118 in meme 103; "Woman in red dress smiling and walking away from couple" referring to woman 126 in meme 103; "Girlfriend with annoyed expression as boyfriend turns around to look at the woman in red dress" referring to woman 122, man 118, and woman 126 in meme 103; "Text of 'a nap' on woman in red dress"

referring to text 128 associated with object 126; "Text of 'ME' on image of boyfriend" referring to text 116 associated with object 118, and "Text of multiple pressing matters and responsibilities on image of girlfriend" referring to text 124 associated with object 122.

As another example, machine learning model 105 may be used to obtain natural language descriptions for meme 123 of "Container, Cran-Raspberry, Ocean Spray, shaven head, rugged guy drinking cranberry juice, tattoo, asphalt road, line on the road, subtle beard and moustache, athletic outfit, unidentified pose of a man, juice, fruit juice container, plastic juice container, label on container, rough man hands, man drinking juice, juice box half full, tattoo on a head, and/or any other suitable natural language descriptions.

For example, as shown in FIG. 1, the system may be configured to input, to first machine learning model 105 (which may correspond to machine learning model 700 of FIG. 7), data associated with, or representative of, at least one meme 103, and based on such input(s), a first machine learning model 105 may output text 106 (e.g., a natural language description(s) of one or more of the visual elements associated with meme 103). For example, a first machine learning model 105 may be trained using training data (e.g., training data 704 of FIG. 7) to receive as input data (e.g., a vector with any suitable number of dimensions) corresponding to meme 103. The training data may comprise any number of visual elements associated with meme 103, such as, for example, people, objects, locations, actions, and symbols. In some embodiments, first machine learning model 105 may be, for example, a neural network, an encoder transformer, a GPT4-V model, a BLIP-2 model, an OTTER model, an MPLUG-OWL model, VGGNet16, LlaMa-Adapter v2, or any other suitable machine learning model, or custom implementations of a machine learning model, or any combination thereof, for visual processing. In some embodiments, such model(s) may be coupled with a large language model (LLM), a default prompt with any other suitable prompt, or any other suitable input. In some embodiments, if a sub-visual item is not able to be identified by first machine learning model 105, the system may segment that item and perform an Internet-based reverse search. In some embodiments, a training dataset for machine learning model 105 may comprise pairs of natural language descriptions and associated visual elements (e.g., images or frames of video) and/or text elements, based on which machine learning model 105 may learn patterns and inferences for determining outputs for future inputs.

In some embodiments, the visual processing may include performing image segmentation (e.g., semantic segmentation and/or instance segmentation) on one or more portions of meme 103 to identify, localize, distinguish, and/or extract the different 2D/3D objects, and/or different types or classes of 2D/3D objects, or portions thereof. For example, such segmentation techniques may include determining which pixels (or voxels) in the image belong to a particular object. Any suitable number or types of techniques may be used to perform such segmentation, such as, for example: machine learning, computer vision, object recognition, pattern recognition, facial recognition, image processing, image segmentation, edge detection, color pattern recognition, partial linear filtering regression algorithms, and/or neural network pattern recognition, or any other suitable technique, or any combination thereof. In some embodiments, the system may identify objects by extracting one or more features for a particular object and comparing the extracted features to those stored locally and/or at a database or server storing features of objects and corresponding classifications of known objects. In some embodiments, the system may extract and analyze text from meme 103, e.g., "a nap," "ME," "multiple pressing matters and responsibilities," using any suitable technique, e.g., segmentation, natural language processing, and/or natural language understanding, and such text may be input to first machine learning model 105 to generate natural language description(s) 106, or otherwise used in generating natural language description(s) 106.

The system may determine a category 108 (e.g., a subculture, or any other suitable category) for meme 103 using any suitable computer-implemented technique. For example, the system may compare keywords obtained at first machine learning model 105 to metadata for certain categories and identify a matching category having matching metadata (e.g., a number of matching words or portions exceeding a threshold). As another example, the system may utilize second machine learning model 107, which receives as input one or more of the natural language descriptions 106 output by first machine learning model 105. The second machine learning model 107 may be trained to output one or more categories 108 (e.g., a subculture, a content type (e.g., text-based, image based, whether the meme comprises multimedia, a topic, or any other suitable category, or any combination thereof), or any other suitable category, or any suitable combination thereof) for meme 103. For example, a training dataset for machine learning model 107 may comprise pairs of natural language descriptions and associated subculture identifiers, based on which machine learning model 107 may learn patterns and inferences for determining outputs for future inputs. Second machine learning model 107 may correspond to machine learning model 800 of FIG. 8. In some embodiments, second machine learning model 107 may be trained using a dataset comprising various textual descriptions and corresponding category (e.g., subculture) labels.

In some embodiments, a second machine learning model 107 may be, for example, a neural network, an encoder transformer, an LDA (latent Dirichlet allocation) model, a latent semantic analysis (LSA) model, a non-negative matrix factorization (NMF) model, or BERT (bidirectional encoder representations from transformers) model, or any other suitable AI model, or any other suitable custom AI model, or any combination thereof. For example, if the system employs the BERT model, this may allow for every output element to be connected to every input element, and the weightings between them may be dynamically calculated based upon their connection.

In some embodiments, the system may determine category 108 based on one or more of natural language descriptions 106; an origin of meme 103; symbols or references associated with meme 103; captions associated with meme 103; an online platform hosting meme 103; comments and/or reactions associated with meme 103, a comparison with similar images, historical and/or societal context associated with meme 103; and/or any other suitable data.

In some embodiments, a social media platform (or other platform) may have top subcultures identified and sorted their data sets already encapsulated on the platform or have access to an external dataset for a subculture that it can access, e.g., via an API, to train model 107 on. In some embodiments, the platform can access external subculture models (e.g., Hugging Face or any other suitable model) outside of the social data platform, such as hosted on a cloud platform, for instance.

In some embodiments, two different (e.g., slightly different) categories (e.g., subcultures) that have content items with common or recurring attributes may leverage transfer learning to accelerate new category or subculture modeling by reusing a pre-trained model. This approach may be bidirectional, meaning memes that have variants may be mapped to a pretrained subculture model to isolate the differences from the original or previous variant meme.

In some embodiments, a social media platform (or other platform) may build a subculture mutation tree as it detects changes of behaviors among the social platform users, by analysis of their posts/shares/comments, and may evolve its subculture dataset and/or prepare for a differentiated model. In some embodiments, subculture tagging of users can be used to place/recommend content (e.g., audio/video) suitable for the relevant audience or suggested connections for following or direct messaging on the platform or other platforms.

In some embodiments, at 110, the system may determine whether meme 103 matches at least one meme stored in memes database 109. For example, the system may compare the identified category 108 (e.g., working professionals subculture) related to meme 103 to the categories of a plurality of memes stored in a meme database 109 (e.g., a database, a knowledge graph or other graph data structure, a semantic map, or any other suitable data structure, or any combination thereof). As another example, the system may compare any suitable portion(s) of meme 103 and/or metadata thereof to elements of memes and/or metadata thereof stored in database 109, to determine a match (e.g., if a threshold number of portions match or a similarity score exceeds a threshold).

In some embodiments, meme database 109 may comprise data associated with a plurality of root memes and a plurality of variant memes, where each respective root meme may be associated with one or more variant memes associated with the respective root meme. Database 109 may store copies of the memes themselves, and/or data representing attributes of the memes (e.g., vectors of any suitable number of dimensions, or using any other suitable data representation) and/or a pointer or hyperlink to one or more of the stored memes. In some embodiments, system 100 may determine that meme 103 is a variant of root meme 115 by determining that visual content of meme 103 corresponds to visual content of a root meme 115 (or a variant thereof). In some embodiments, the system determines that an image should be added to the meme data structure 109 (e.g., that the image qualifies as a "meme") by determining that the image is associated with a plurality of images, a number of which correspond to a threshold number of user-generated variations (e.g., 1000, or any other suitable threshold) of the image. For example, the system may crawl the Internet or otherwise monitor social media platforms or other suitable platforms to identify images, created by users or otherwise computer-generated, that are similar to a particular image (e.g., comprise similar visual elements and/or similar text), to determine whether the image should be added to database 109 as a root meme. In some embodiments, the system determines that a meme is a variant of a root meme, and that such variant meme should be stored in the meme data structure 109 in association with the root meme, by determining that at least one visual element of a root meme is present in both the root meme and the modified version of the meme and determining that a calculated similarity score between the root meme and the modified version of the meme exceeds a threshold.

In some embodiments, at 110, the system may determine that the identified category 108 of meme 103 matches at least one category of (and/or visual elements and/or textual elements of) a second meme (e.g., meme 115) for which associated data is stored in the meme database 109. In some embodiments, the system may determine that the identified category 108 of meme 103 matches at least one category of a second meme (e.g., meme 115) stored in the meme database 109 by comparing attributes and/or metadata (e.g., natural language descriptions 106) of meme 103 to attributes and/or metadata of a meme(s) stored in the database 109. In some embodiments, the system may determine that meme 103 is an exact match to a meme in the database, and processing may proceed to 111 to determine whether meme 103 is sufficiently popular. If no match is found at 110, the system determines that meme 103 does not match any memes in database 109 and processing may return to 117; if one or more matches are found at 110, processing may proceed to 111.

At 111, the system may determine whether the second meme (e.g., meme 115), memes associated with the second meme (e.g., a root meme if meme 115 is a variant meme, or a variant meme(s) if meme 115 is a root meme), and/or meme 103, are sufficiently popular to use. In some embodiments, the system may determine whether the second meme (or memes associated therewith in database 109) is sufficiently popular to use by determining whether a number of times the second meme has been posted (e.g., on social media platform 104 and/or on other platforms) exceeds a threshold, by determining a number of electronic communications associated with the second meme, by determining whether a number of times the second meme has been posted or reshared (e.g., on social media platform 104 and/or on other platforms) or viewed exceeds a threshold, by determining whether one or more celebrities have posted the meme or its variants, by determining a number of times the meme has been recently posted (e.g., within the last 24 hours) exceeds a threshold, based on metadata of the meme, or based on any other suitable factors, or any suitable combination thereof. If at 111 the system determines the second meme (e.g., meme 115) is sufficiently popular, processing may proceed to 119; otherwise processing may return to 117.

At 119, the system, having determined that the category of the second meme (e.g., meme 115) matches the category of meme 103 (and/or that attributes of meme 103 sufficiently overlap with attributes of meme 115), and that the second meme exceeds a popularity threshold, may identify supplemental content 112 related to the category of meme 103 and/or the second meme (e.g., meme 115) or otherwise related to metadata or the subject matter of meme 103 and/or meme 115. The system may cause supplemental content 112 to be provided for presentation in a vicinity of first meme 103 at the display of computing device 102. In some embodiments, supplemental content 112 is identified by determining a similarity exists between metadata (e.g., natural language descriptions or metadata tags) of supplemental content 112 and metadata (e.g., natural language descriptions or metadata tags) of category 108 associated with meme 103 and/or meme 115. In some embodiments, the supplemental content may be received from a supplemental content provider or may be provided by the social media platform 104. In some embodiments, supplemental content 112 may be, for example, one or more advertisements, promotions, surveys, public announcements, interactive content, and/or any other suitable content related to the identified category 108. The system may leverage the capability of memes to segment the population to properly align supplemental content with content of the meme.

In some embodiments, it may be advantageous to display supplemental content that is related to a meme. For example, as shown in FIG. 1, instead of an advertisement associated with farming equipment, e.g., "John Deere" indicated in supplemental content 114 at 117 advertising the sale of tractors, the system may provide for display a supplemental content item 112, e.g., an advertisement from "Office Depot," based on determining that meme 103 related to the category "Working Professionals." The system may determine that such "Office Depot" advertisement is more similarly related to meme 103 because it relates to the identified category of the meme (e.g., shares a threshold number of metadata terms with category 108, or otherwise depicts similar content to meme 103). The system may identify the category or topic of meme 103 using the methods described in FIG. 1. For example, as shown in FIG. 1, the category of the meme 103, was identified as "Working Professionals Subculture." An advertisement from "Office Depot" related to "restocking supplies" and "refreshing your space" is identified as being related to the category of "Working Professionals" because the system may determine that the "Working Professionals" category is associated with users who work in offices and typically buy such things as office supplies. Therefore, the supplemental content may be tagged with metadata such as "office," "corporate," "responsibilities," "professionals," or any suitable combination thereof. On the other hand, the "John Deere" advertisement is related to farming, which the system determines is not relevant to the category of "Working Professionals." The supplemental content for "John Deere," may be tagged with metadata such as "farming," "tractors," "agricultural," "rural," or any suitable combination thereof.

As another example, if meme 123 is identified for presentation at computing device 102, the system may determine that a category associated with meme 123 is "rugged people consuming healthy food or beverages," and the system may provide supplemental content (e.g., related to a veggie burger) in a vicinity of meme 123. In some embodiments, the system may determine how likely a user is to dwell on a specific portion of a webpage based on how closely the user's profile aligns with the meme, e.g., if a user is predicted to dwell on the page for a relatively long time to read and reread the meme, a supplemental content provider may have more incentive to insert its supplemental content near the meme and/or provide a link to its supplemental content to the social media platform. In some embodiments, the supplemental content may be queued up for when user input is received, e.g., selection of an icon. In some embodiments, the system may suggest to a first user to follow and/or connect with other, second users who are aligned with the same category of a meme as the first user, e.g., the system makes a recommendation of other, second users to follow or connect with based on the determination that the first user and the other, second users are both aligned with the category associated with meme 123 "rugged people consuming healthy food or beverages."

In some embodiments, the system may be configured to identify the category (e.g., subculture) 108 and/or topic of a meme (e.g., meme 103), which may be based on database 109 of memes having been tagged and sorted, and/or organizing memes (e.g., root memes and variant memes) into different subcultures or categories. The system may identify any subculture change within the variation of a meme (e.g., associated with root meme 115 of FIG. 1), and the system may build a variation tree of a meme to track the history, evolution and mutation of the meme (e.g., based at least in part on a distance from a root meme source within data structure 109). The system may strategically associate and map supplemental content to a meme at its peak virality and/or based on the subculture and topic of the meme and/or based on a distance of the variance of the current meme from the root meme. Such features may enable brands to automatically modify viral meme variations to incorporate such memes into a message of their supplemental content (e.g., advertisement campaign).

Figure 2A:
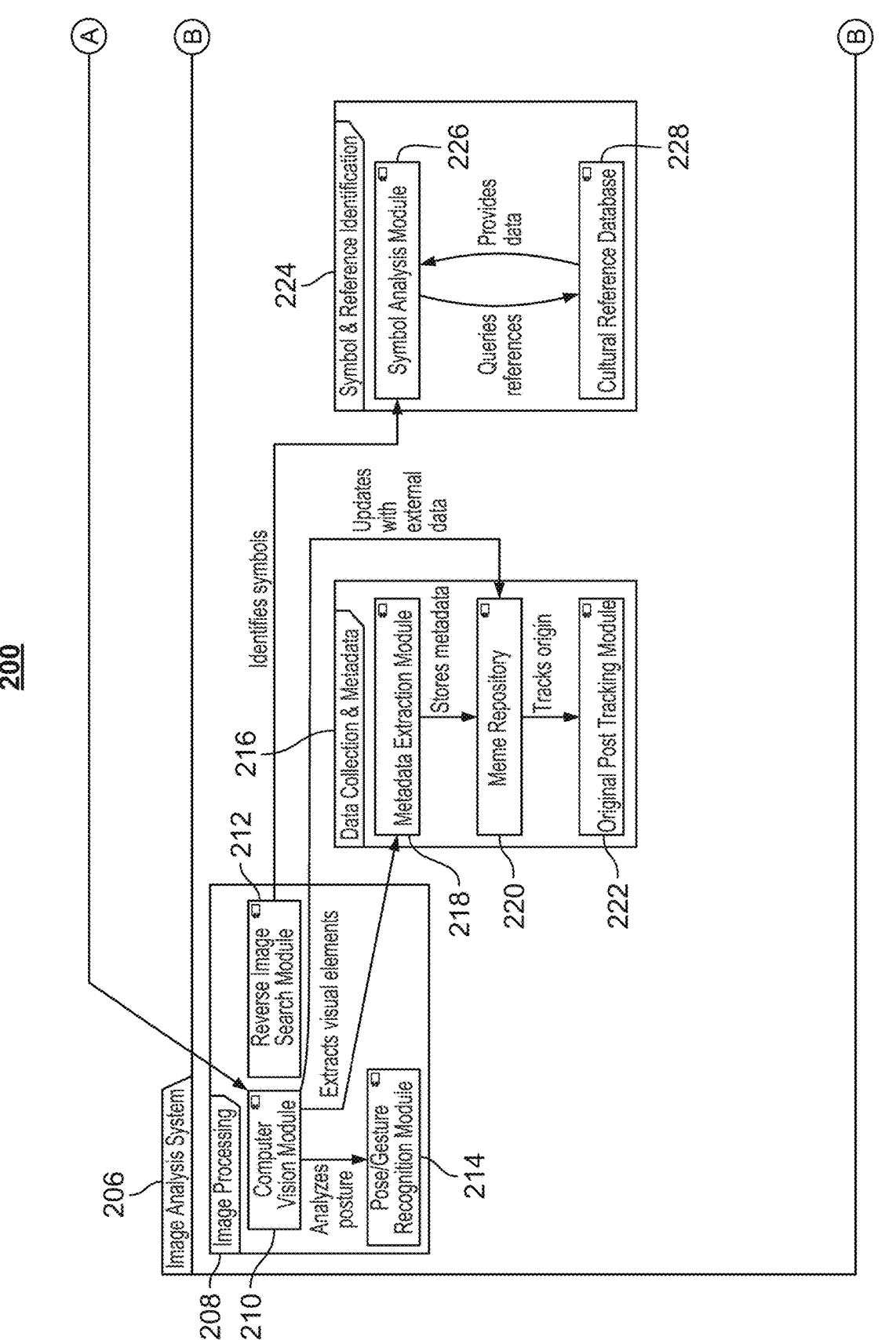
FIGS. 2A and 2B show an illustrative architecture and an illustrative sequence diagram for determining a category of a meme, in accordance with some embodiments of this disclosure.
Figure 2A:
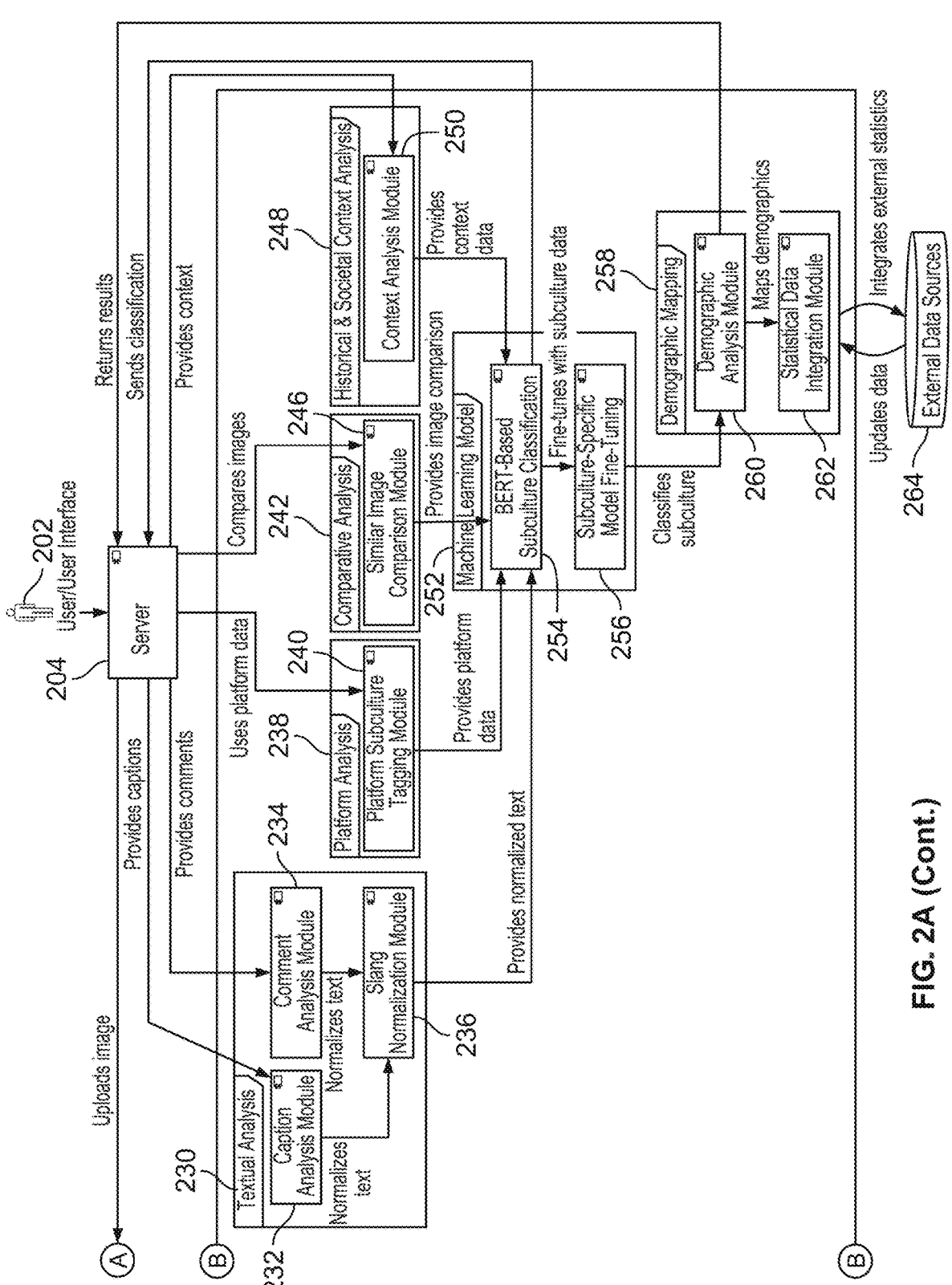
Figure 2B:
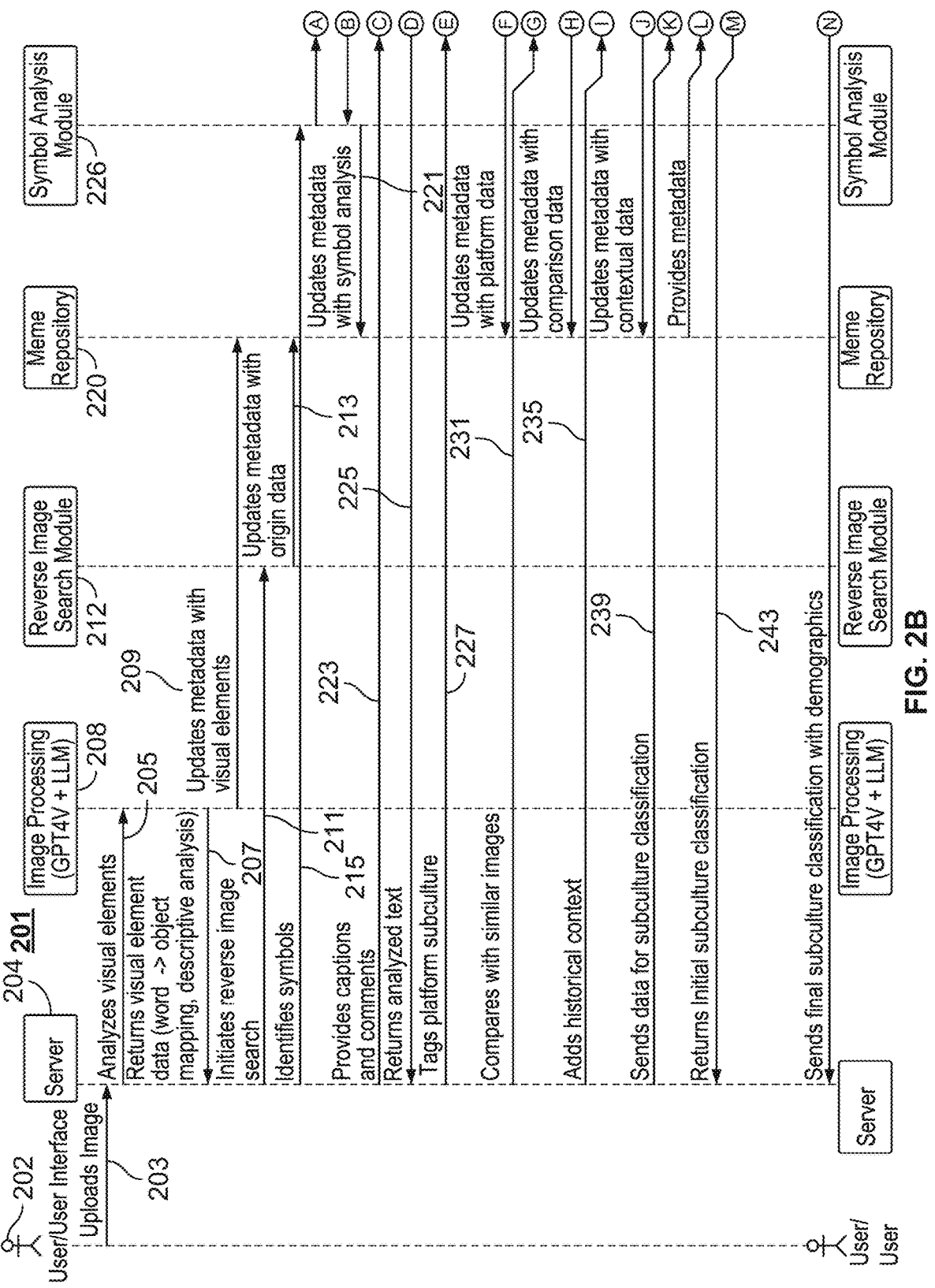

FIG. 2A shows an architecture diagram for an illustrative system 200, in accordance with some embodiments of this disclosure. FIG. 2B shows an illustrative sequence diagram 201 for determining the category of the meme, in accordance with some embodiments of this disclosure. System 200 may correspond to system 100 of FIG. 1. At 203, a meme (e.g., meme 103 of FIG. 1) may be generated or identified by a user/user interface 202 (e.g., based on user inputs received from the user, and user/user interface 202 may post or upload the meme to a server 204 and/or a database. In some embodiments, server 204 may be a server of a social media platform (e.g. social media platform 104), or any other suitable platform. In some embodiments, image analysis system 206 may be hosted at or otherwise implemented at server 204. For example, server 204 may comprise one or more servers, over which processing may be distributed, which may be configured to implement the modules described in FIGS. 2A-2B. In some embodiments, the meme may be automatically generated, e.g., without user input, and/or may be retrieved by, or received at, the system (e.g., for storage at a database) from any suitable source. Once the meme is uploaded via the user interface and transmitted to server 204 or otherwise accessed or obtained, the meme may, at 205, be received and analyzed using an image analysis system 206. The image analysis system 206 may include an image processing module 208, a data collection and metadata module 216, a symbol and reference identification module 224, a textual analysis module 230, a platform analysis module 238, a comparative analysis module 242, a historical and societal context analysis module 248, a machine learning model 252, and a demographic mapping module 258 (e.g., to map users to one or more subcultures). The image analysis system 206 may analyze every multimodal element of the meme, whether it is visual (e.g., image- or video-based), text, and/or audio. For example, the image analysis system 206 may include an image processing module 208, which may include a computer vision module 210, reverse image search module 212, a pose/gesture recognition module 214, and/or any other suitable modules. In some embodiments, audio data may be fingerprinted and recognized, and any lyrics or words identified in the data derived may be leveraged. In some embodiments, during a pre-analysis, the system may determine certain key frame(s) in an image/video that is/are repeated throughout the meme, to account and amplify their influence as a mathematical parameter in the techniques described herein.

In some embodiments, image processing module 208 may comprise computer vision module 210, pose/gesture recognition module 214, and/or reverse image search module 212. Image processing module 208 may dissect an image (e.g., meme 103), to identify people, objects, locations, actions, and/or symbols included in the image using any suitable computer-implemented technique, e.g., as described in connection with machine learning model 105 of FIG. 1. Such elements may be used as clues regarding the cultural context of the image. For instance, as shown at 106 of FIG. 1, image processing module 208 may output one of more of natural language descriptions 106. In some embodiments, output of image processing module 208 may be a mapping of text to objects (e.g., in meme 103 of FIG. 1) that is explaining or summarizing what is happening in the image. In some embodiments, determining a category (e.g., subculture) of an image (e.g., a meme) may involve understanding the context, symbols, and references within the image, and/or considering the communities and audiences that engage with it.

Image processing module 208 may determine and/or analyze one or more details and/or characteristics of each sub-content item (e.g., objects in meme 103 of FIG. 1). In some embodiments, image processing module 208 may return (at 207) visual element data (e.g., word and object mapping, and/or descriptive analysis) to server 204. For example, image processing module 208, using computer vision module 210, may determine and/or analyze a color type, color intensity, palette, resolution, size of objects, sequence of objects, or any other suitable characteristics, or any suitable combination thereof, in the meme (e.g., meme 103 of FIG. 1). In some embodiments, weightings may be assigned to sub-content items based on their appearance and/or location within an image (e.g., visual content included in meme 103 of FIG. 1). If a particular sub-content item has a pronounced appearance (e.g., shiny or colorful object vs. dim appearance of an object, or relative sizes of object is different), a numerical value representing the pronounced appearance may be recorded or associated with the particular sub-content item to denote its significance.

In some embodiments, server 204 may provide instructions or a request, at 211, to reverse image search module 212 to perform reverse image searching using one or more algorithms, such as, for example, scale-invariant feature transforms, by comparing local features of an image to images stored in one or more databases or at one or more content platforms, to understand if the image has existed outside of the social media platform on which it has been posted by user/user interface 202, and updating metadata (at 213) associated with the meme with that information (e.g., linking the source URL associated with origin data).

In some embodiments, image processing module 208 may use pose/gesture recognition module 214 to analyze poses and gestures within the image. For example, the system may employ two-dimensional (2D) skeletal mapping and/or hand pose estimation techniques. At 209, the output of pose/gesture recognition module 214 may be used as input into metadata extraction module 218 and symbol analysis module 226 (see, e.g., FIG. 2A) to assist in determining the category (e.g., subculture) of the meme. At 209, the output of image processing module 208 may also be used as input into meme repository 220 to update metadata with visual elements. The visual elements may include data and/or output based on analysis of pose/gesture recognition module 214 and computer vision module 210.

In some embodiments, the output of image processing module 208 may be received as input in data collection and metadata module 216. Data collection and metadata module 216 may comprise metadata extraction module 218, meme repository 220 and/or original post tracking module 222. Using the techniques discussed in relation to image processing module 208 to extract visual (and/or textual and/or audio data) and sub-visual elements of the meme, metadata associated with the image may be extracted using a metadata extraction module 218. The metadata may include, for example, the date the meme was originally or first posted on a social media platform. The metadata extraction module 218 may trace the origins of the meme to the date the meme was originally posted on a social media platform using original post tracking module 222. The metadata may include any information associated with the user profile of the user who posted the meme as well as any metadata of other user profiles of users who have also posted the meme. For example, the system may determine the user profile that posted a meme may have certain profile features that impact the context of the meme, and vice versa. In some embodiments, the visual elements received as input from image processing module 208, as well as the metadata extracted from the metadata extraction module 218, may be stored in or by the data collection and metadata module 216, which may include a meme repository 220 (e.g., which may correspond to database 109 of FIG. 1).

In some embodiments, the output of image processing module 208 may be received as input to symbols and reference identification module 224, which may comprise symbol analysis module 226 and/or cultural reference database 228. At 215, symbols analysis module 226 may analyze any visual symbols or icons within the meme and/or an output of the computer vision module 210 of FIG. 2A. At 217, symbol analysis module 226 may query references from cultural reference database 228, and at 219, cultural reference database 228 returns reference data to symbol analysis module 226. For example, a tattoo may be shown that represents rebellion, counterculture, unity and/or brotherhood within a particular subculture. At 221, symbol analysis module 226 may update metadata based on results of the symbol analysis processes to be received by meme repository 220.

In some embodiments, computer vision module 210 may perform visual processing based at least in part on performing image segmentation (e.g., semantic segmentation and/or instance segmentation) on one or more portions of meme 103 to identify, localize, distinguish, and/or extract the different 2D/3D objects, and/or different types or classes of 2D/3D objects, or portions thereof. For example, such segmentation techniques may include determining which pixels (or voxels) in the image belong to a particular object. Any suitable number or types of techniques may be used to perform such segmentation, such as, for example: machine learning, computer vision, object recognition, pattern recognition, facial recognition, image processing, image segmentation, edge detection, color pattern recognition, partial linear filtering regression algorithms, and/or neural network pattern recognition, or any other suitable technique, or any combination thereof. In some embodiments, the system may identify objects by extracting one or more features for a particular object and comparing the extracted features to those stored locally and/or at a database or server storing features of objects and corresponding classifications of known objects.

In some embodiments, at 223, captions and/or comments from the meme uploaded to a server 204 may be received and analyzed using a textual analysis module 230 of the image analysis system 206. The textual analysis (captions & comments) module 230 may comprise caption analysis module 232, comment analysis module 234, and slang normalization module 236. In some embodiments, captions or text may be the primary (or only) alteration from a root meme. For example, if a caption is included in a meme, the textual analysis module 230 may analyze whether the particular caption belongs to a particular language category, such as, for example, slang, idioms, or business jargon, which may have a significance associated with the meme. In some embodiments, textual analysis module 230 may analyze one or more comments and reactions associated with the meme (e.g., on a social media platform). In some embodiments, analyzing both the caption(s) and the comments/reactions associated with the meme may assist in categorizing the meme. At 225, text analysis module 230 returns analyzed text to the social media platform (e.g., associated with server 204).

In some embodiments, the online platform hosting the meme uploaded to a server 204 may be received and analyzed using platform analysis module 238 of the image analysis system 206. Platform analysis module 238 may comprise platform subculture tagging module 240. Server 204 may provide instructions or a request, at 227, to platform subculture tagging module 240 to tag the platform subculture. Platform analysis module 238 may extract metadata associated with the platform on which the meme has been posted or a platform at which the meme is otherwise identified for presentation, and at 229, such metadata may be used to update meme repository 220. The extracted metadata associated with the platform on which the meme was posted may assist in categorizing the meme. For example, if the meme was posted on the Parler Platform, a tag may be added to the meme that it is associated with a conservative political party category.

In some embodiments, the meme uploaded to a server 204 may be received and analyzed using a comparative analysis module 242 of image analysis system 206. Comparative analysis module 242 may comprise similar image comparison module 246. Server 204 may provide instructions or a request, at 231, to similar image comparison module 246 to analyze similar images (e.g., which may or may not be memes) to allow the meme to be compared to a similar image to analyze if reoccurring themes and/or symbols are present, and at 233, similar image comparison module 246 updates metadata with comparison data at the meme repository 220.

In some embodiments, the meme uploaded to a server 204 may be received and analyzed using a historical and societal context analysis module 248 of the image analysis system 206. The historical and societal context analysis module 248 may comprise context analysis module 250. Server 204 may provide instructions or a request, at 235, to context analysis module 250 to provide/add historical context, e.g., historical and societal context module 248 may analyze any societal context in which the meme was created, such as historical events, trends, and social movements, to assist in further categorizing the meme, and at 237 updates metadata in the meme repository based on such analysis.

In some embodiments, a machine learning model 252 may receive as input multi-modal element of the meme, whether it is visual, text (e.g., of a caption, or natural language description 106 of FIG. 1), and/or audio, extracted from image processing module 208, data collection and metadata module 216, symbol and reference identification module 224, textual analysis module 230, platform analysis module 238, comparative analysis module 242, and/or historical and societal context analysis module 248. Machine learning model 252 is configured to use the multi-model elements to output a category (e.g., subculture) associated with the meme. In some embodiments, machine learning model 252 may correspond to machine learning model 107 of FIG. 1. In some embodiments, machine learning model 252 may comprise BERT-based subculture classification module 254 and/or subculture-specific model fine-tuning module 256. For example, at 239, the system may transmit data from server 204 for subculture classification to BERT-based subculture classification module 254, and (e.g., data associated with any suitable number of root memes and variant memes associated with a root meme) from meme repository 220 to module 254. At 243, module 254 may return an initial subculture classification to server 204, and at 245, may provide a fine-tuned classification to demographic analysis module 260.

In some embodiments, machine learning model 252 may be trained based at least in part using a subculture dataset and a subculture model, e.g., social media platforms (or any other suitable platform) may comprise a subculture engine that includes such subculture dataset and subculture model. For example, certain platforms may maintain a list of subcultures on their platform such as, for example, MAGA (Make America Great Again) culture, Millennials, Gen-X, Swifties, Hippies, Vegetarians, Woke culture, dog/cat owners, tea/coffee drinkers, or any other suitable subculture or category, or any combination thereof. In some embodiments, a social media platform may utilize basic subculture models initially, and as certain memes start differentiating from the main subcultures, may add and/or train subculture models incrementally, e.g., using LDA, LSA, NMF, an encoder transformer, BERT, or any other suitable technique, or any combination thereof. In some embodiments, the system may, to zero in on the contextual part of the meme, and since the number of subcultures may not be limited, utilize BERT as machine learning model 252, a deep learning model in which every output element is connected to every input element, and the weightings between them may be dynamically calculated based upon their connection. Machine learning model 252 may have contextual identification capabilities and may not be impacted by an order of the words (e.g., natural language descriptions 106) output by machine learning model 105.

In some embodiments, machine learning model 252 may use words derived during the visual element (e.g., natural language description 106 of FIG. 1), comment, caption analysis steps as initial specification or embeddings, and may be used to further discover connotation or context that may not have been originally found during previous steps and/or that may be hidden. In some embodiments, one or more machine learning models 252 may be fine-tuned to specific subcultures, e.g., specific to common characteristics of a subculture. For instance, a model trained for Swifties (Taylor Swift fans) may include any element related to that subculture such as, for example, a training dataset comprising any suitable data related to her concerts, songs and lyrics thereof, outfits, accessories, tour/concert schedule, any news about her social life and to the level of what sort of bracelets (visual elements) that her followers wear, and/or any other suitable data, or any combination thereof. Such model may take into account multi-modal data such as audio, text, video and/or images as part of its full data set.

In some embodiments, initial embeddings to machine learning model 252 may be based at least in part on positional embedding, sentence embedding, and/or token encoding of the initial embedding. Position embedding describes the position of the words from the output of each multi-modal element of the meme extracted from image processing module 208, the data collection and metadata module 216, the symbol and reference identification module 224, the textual analysis module 230, the platform analysis module 238, the comparative analysis module 242, and the historical and societal context analysis module 248. Sentence embedding describes the sentences or phrase of each multi-modal element of the meme extracted from image processing module 208, the data collection and metadata module 216, the symbol and reference identification module 224, the textual analysis module 230, the platform analysis module 238, the comparative analysis module 242, and the historical and societal context analysis module 248. In some embodiments, token encoding describes words derived during the visual analysis (e.g., natural language description 106), analysis or captions and/or comments and/or any other suitable analyzed text data. In some embodiments, token encoding refers to captions and may be implemented using a string split function or any other suitable computer-implemented technique. In some embodiments, the system may remove any numerals or punctuation associated with the captions, and may normalize any slang/jargon words by replacing them with their original words (e.g., "stonks" may be replaced or otherwise considered synonymous with "stocks"). The system may lemmatize words to their original form, and/or normalize grammatical errors/deviations, mismatched modifiers, manipulated language, and/or lexical puns. For example, machine learning model 252 may be trained to learn that the use of such manipulated language can be deliberate errors that add a fun, parodic, and/or sarcastic element to the memes, even if grammatically or syntactically incorrect (e.g., "much birthday, very candle" in a meme depicting a dog and phrases related to birthdays).

In some embodiments, in training machine learning model 252, training data comprising text may be tokenized, e.g., using any suitable natural language processing (NLP) or natural language understanding (NLU) techniques, to reduce the text to individual units (e.g., words or punctuation marks), or tokens. For example, each word in a text corpus may be used to train model 252, in order to represent each word as a vector in a vector space. In training the machine learning model 252, a neural network may be employed with one or more hidden layers, where the weights of the hidden layer(s) may correspond to the vectors (e.g., numerical representations of tokens, or words) being learned. For example, if two words are similar to one another, the vectors may appear closer to each other in the vector space. In some embodiments, the system may utilize the architectures of a Continuous Bag of Words model or a Continuous Skip-gram model to generate word embeddings, as discussed in Mikolov et al., "Efficient Estimation of Word Representations in Vector Space," ICLR Workshop, 2013, which is hereby incorporated by reference herein in its entirety. In some embodiments, machine learning model 252 may be trained to categorize image data into particular categories (e.g., subculture). In some embodiments, machine learning model 252 may be used to obtain vector representations even for textual descriptions (and/or images) that model 252 has not been previously exposed to. Embeddings may be vectors or arrays of numbers that represent the meaning and context of tokens processed by machine learning model 252 and may be derived from parameters and/or weights of machine learning model 252, and/or may be used to encode or decode input or output text.

In some embodiments, since certain content item elements of a meme may be related under the same subculture type, the embedding steps described above may identify such correlations. For example, an output layer of machine learning model 252 may utilize the specific subculture full data set as a task to figure out the subculture of the digital meme, and such fine-tuning step may ensure the classification of the meme to one or more subcultures. If the system determines that most of the embedding tokens map into a particular category (e.g., subculture), and the output layer is showing an overwhelming alignment with a subculture, execution of the inference process may be short-circuited, to further fine-tune this process. In some embodiments, if a specific token is used to identify the subculture of a meme (e.g., by one of the stacked BERT encoder stage), the system may mark that token as the top metadata of the meme, and that token may be used as a meme variant assigner. The system may, based on determining that the meme is receiving a low perplexity and high coherence score of mapping into a subculture, determine the task is complete. In some embodiments, based on the complexity of the meme and/or the features of a subculture, additional BERT encoding layers may be employed in machine learning model 252 using more parameters.

In some embodiments, if one multi-modal LLM is not able to generate a minimum threshold of subculture-relevant visual embeddings, another visual LLM may be employed. If more than one multi-modal LLM is involved, before feeding their output to the BERT encoder, further pruning may be performed to eliminate redundancies for sentence and token embeddings. In some embodiments, ambiguity or failure to detect a visual element (or any other parameter) by one multi-modal LLM can be an input prompt for another multi-modal LLM to increase accuracy or minimize or avoid hallucination.

In some embodiments, machine learning model 252 may output more than one category associated with the meme such as a primary and multiple other categories (secondary, tertiary, etc.). Once the category (e.g., subculture) of the meme is determined (e.g., based on output from machine learning model 252), the system may, at 247 and 249, map such category to one or more of age, sex, demographic of further subgroups of a population or geography using demographic mapping module 258. Demographic mapping module 258 may comprise demographic analysis module 260 and/or statistical data integration module 262. In some embodiments, the system may assign certain weightings and/or percentages to subculture tagging. Demographic mapping module 258 may analyze existing statistics about a category and may leverage this existing data if available to help further classify the category of the meme. For example, the system may retrieve and/or access a survey indicating that in the U.S., 53% of adults are fans of Taylor Swift, of whom 44% identified as Swifties and 16% as her "avid" fans. Of the fans, 52% were women while 48% were men. Racially, the 74% of the fans were white, 13% were Black, 9% were Asian, and 4% from other races. Politically, 55% of the fans were Democratic, 23% were Republican, and 23% were independent. In terms of generations, 45% are millennials, 23% are baby boomers, 21% are Generation X, and 11% are Generation Z.

In some embodiments, the system may use such information to further categorize and/or generate metadata for the meme, e.g., associated certain demographic groups with the category of "Swifties." For example, if a user (e.g., user 120 of FIG. 1) is accessing a platform (e.g., social media platform 104 of FIG. 1), preferences for such user stored in a profile (e.g., a demographic of such user) may be compared to demographic information associated with a meme identified for presentation (e.g., meme 103 of FIG. 1), and based on determining that there is a match between the profile of the user and a demographic and/or metadata associated with meme 103, the system may identify supplemental content (e.g., 112 of FIG. 1) to be provided for display in a vicinity of meme 103.

In some embodiments, the output of the demographic mapping module 258 may be provided to an external data source 264 such as a server or a supplemental content provider. The output of the demographic mapping module 264 may also be provided to the server 204. For example, output of the demographic mapping module 258 may output an identified category of a meme (e.g., category 108 related to meme 103 of FIG. 1) to an external data source 264 such as a supplemental content provider such that the category may be mapped to a related supplemental content (e.g., supplemental content 112 related to meme 103 of FIG. 1). At 251, demographic data may be provided by subculture demographic database 264 to demographic mapping module 258, which in turn may provide an updated demographic mapping to the social media platform.

Figure 3:
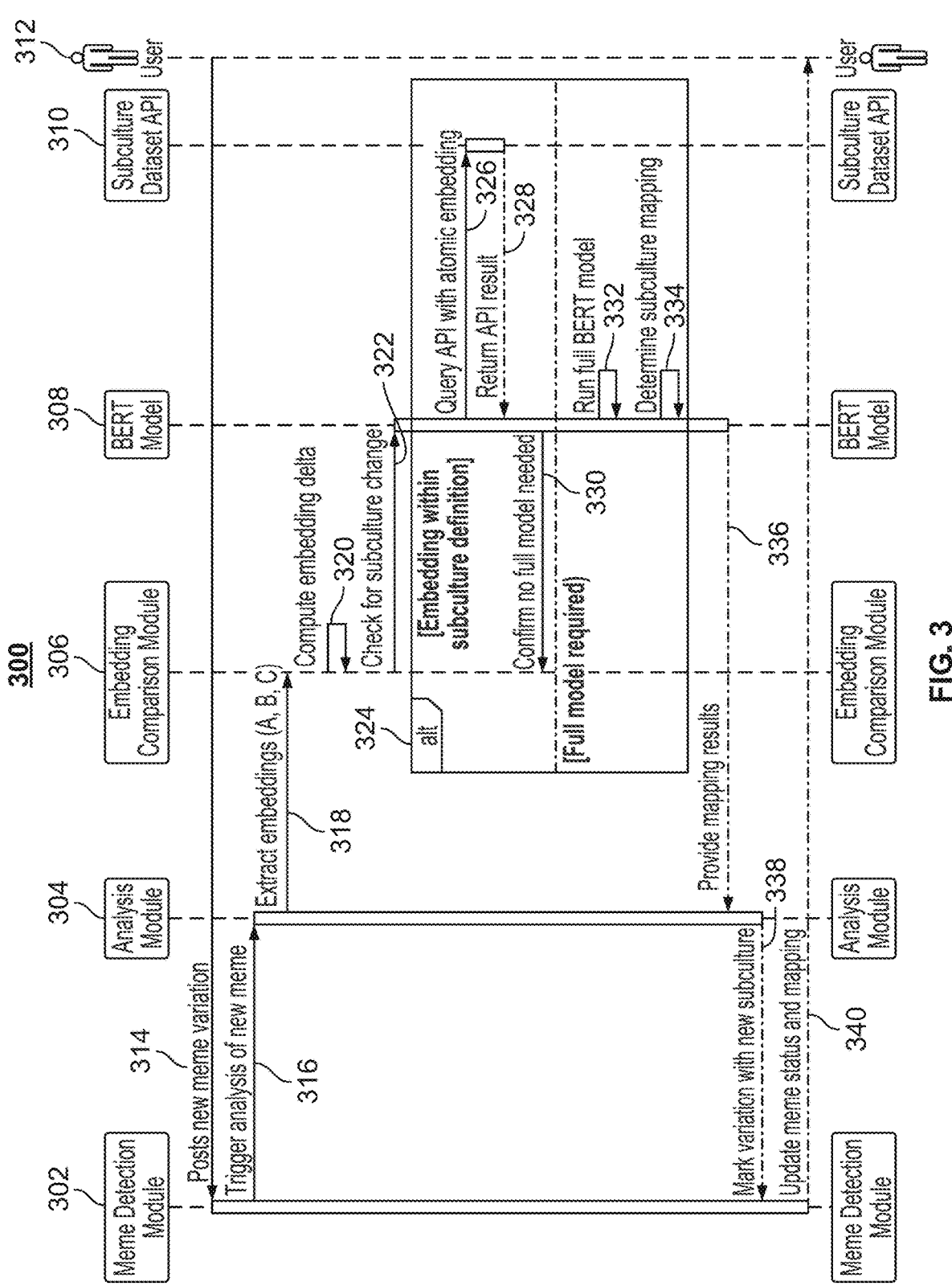
FIG. 3 shows an illustrative sequence diagram for identifying variations of a meme, in accordance with some embodiments of this disclosure.

FIG. 3 shows an illustrative sequence diagram 300 for identifying variations of a meme, in accordance with some embodiments of this disclosure. In some embodiments, the system may comprise meme detection module 302, analysis module 304, embedding comparison module 306, BERT model 308, subculture dataset API 310, and/or any other suitable components, or any suitable combination thereof.

In some embodiments, at 314, the system receives a post from user 312 of a new meme variation (e.g., new meme variation 103 of original meme 115 is posted to social media platform 104 of FIG. 1). The system, using a meme detection module 302, may detect changes in either the captions or the visual content of a meme (or any other suitable portions of the meme) posted by user 312, with respect to a root meme (e.g., root meme 115 stored in database 109 of FIG. 1). As the platform detects changes in either the captions or the visual content of the meme, the new mutated meme may be marked as a variation.

At 316, the system may, using meme detection module 302, trigger analysis of the new meme (received at 314) using analysis module 304. Analysis module 304 may process the new meme variation, in a manner similar to the processing performed by image analysis system 206 as described in FIGS. 2A and 2B. In some embodiments, to accelerate the category mapping process, at 318, one or more embeddings may be extracted, such as, for example, the positional embedding, sentence embedding, and token encoding of the initial embedding of the original meme. At 318, the system may take into account the full meme analysis where weightings for every atomic element of the content may have been assigned, as well as sub-content elements (intensity, color, tone, pitch, location, etc.) which may be used as attention masks. In some embodiments, the embeddings extracted at 318 may be compared to the positional embedding, sentence embedding, and token encoding associated with the new meme variation, to identify (at 320) the embedding token delta using embedding comparison module 306.

At 322, the output of embedding comparison module 306 may be received by machine learning module 308 (which may correspond to machine learning model 252 of FIG. 2A and machine learning model 107 of FIG. 1) to detect whether a category change is present between the original meme (e.g., root meme stored in data structure 109 of FIG. 1) and the new variation of the meme (received at 314). In steps 324-334, the system may determine whether the full model 308 should be executed. In some embodiments, if the output of model 308 results in a subculture mapping change, the modified embeddings may be marked as the reason for the remapping. In some embodiments, at 326, a subculture data set may be queried via an API 310 to determine whether an atomic embedding is within its definition, based on the API result returned at 328. If not, at 330, running the full model may be avoided. For example, the system may map a variant meme (e.g., variant meme 125) into, e.g., a journalism or writers' subculture or any other suitable subculture, e.g., based on extracted and analyzed captions or text of "the journalistic integrity of my newspaper" identified in meme 125, which may differ from other variants of root meme 115 and/or root meme 115. In some embodiments, such new captions or text may be marked as embeddings that made the difference from the original subculture mapping. In some embodiments, the reverse image process may have already determined the original (e.g., root) meme and tag this variant (received at 314) belonging to the root tree; however, since the differentiating factor may have primarily been the captions, the system may assign a higher weighting of the captions words before running model 308.

In some embodiments, if the system determines (e.g., using machine learning model 105 of FIG. 1) that a particular element or attribute of the meme variation (received at 314) is pronounced, e.g., a tattoo is really colorful or highlighted or outlined, the system may add a higher embedding to such element or attribute, to flag to the system to pay more attention to such element or attribute when determining the meme category, e.g., because this may be the tiebreaker between two different categories or data sets for classifying the new meme variant. Once it is determined that most of the embedding tokens map into a particular subculture and an output layer is showing an overwhelming alignment with a subculture, full execution of the inference process may be short-circuited.

In some embodiments, machine learning model 308 may identify a particular meme as a variant of another meme that belongs to a different category than such other meme. The system may identify a characteristic of the third meme that causes the third meme to be classified as belonging to the different category, and assign, in machine learning model 308, a relatively higher weighting in association with an embedding for a token corresponding to the characteristic of the third meme, At 336, machine learning model 308 provides mapping results to analysis module 304, and at 338, the variation may be marked with new subculture (e.g., new meme variant 103 may be mapped to the subculture "working professionals subculture," in addition or in the alternative to a "relationships, infidelity, and loyalty" subculture to which original meme 115 may be mapped). At 340, the status and the mapping of the meme may be updated and provided to the user 312.

Figure 4:
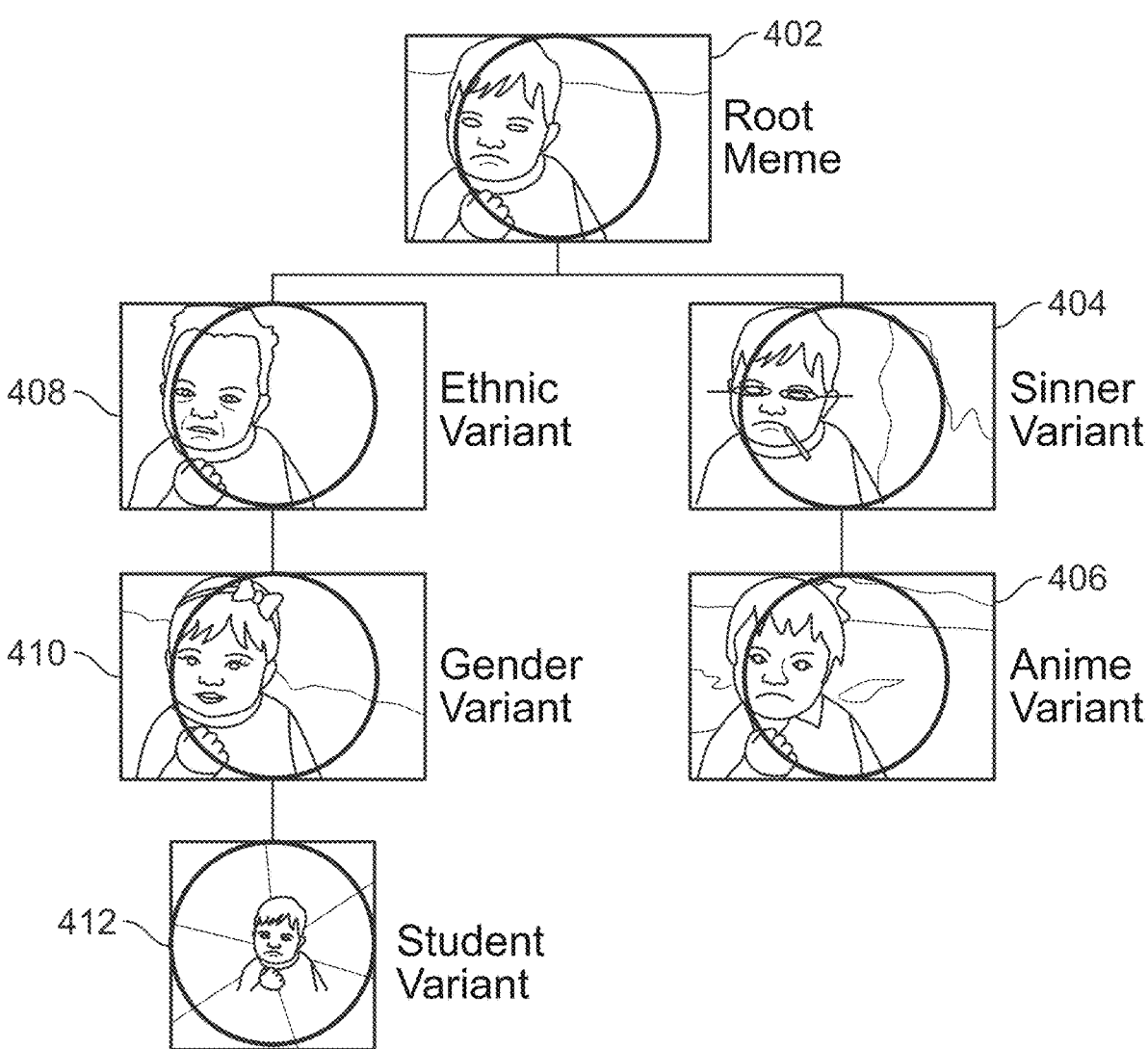
FIG. 4 shows an illustrative meme data structure, in accordance with some embodiments of this disclosure.

FIG. 4 shows an illustrative meme data structure 400, in accordance with some embodiments of this disclosure. In some embodiments, as the different variants of a meme are detected (e.g., on various Internet platforms) or otherwise determined, the system may access, update and/or generate a data structure 400 (e.g., a graph structure, a knowledge graph, a hierarchical tree, a bi-directional graph, buckets, or arrays, or any other suitable data structure, or any combination thereof). In some embodiments, data structure 400 may be indicative of an evolution of a one or more memes. Data structure 400 may comprise, for example, root meme 402, and variant memes 404, 406, 408, 410, and 412. The data structure may comprise any suitable number of root memes and associated variant memes. In some embodiments, data structure 400 may correspond to memes database 109 of FIG. 1.

In some embodiments, a root meme, e.g., root meme 402, may correspond to the well-known "Success Kid" meme. For example, the system may identify root meme 402 based on the root meme being posted on a social media platform or otherwise shared via an electronic communication. Root meme 402 may be assigned a meme identifier (ID) that all subsequent meme variations of root meme 402 may inherit. The meme variations (e.g., variant memes 404, 406, 408, 410, and 412 may also have respective variation IDs. For example, the system may have identified "Sinner Variant" 404, "Anime Variant" 406, "Ethic Variant" 408, "Gender Variant" 410, and "Student Variant" 412 as having been posted on one or more platforms on the Internet, and may determine that such memes are new meme variants of root meme 402 based on a comparison of one or more characteristics of such memes to root meme 402 and/or other variant memes associated with root meme 402 in data structure 400. In some embodiments, the system may cause portions of data structure 400 (e.g., leaves of the tree structure) to be marked with metadata for each variant and/or its relevant one or more categories (e.g., subcultures). In some embodiments, related or sub-subcultures may be stored in association with each other, e.g., placed on the same leaf or portion of the data structure, which may facilitate searching data structure 400 for meme variants, e.g., for use by a user in a social media post.

In some embodiments, the system may determine a location or position of a particular variant meme within a hierarchy of data structure 400 based on, for example, a number of times the particular meme variant has been posted and/or shared; a relation of the category of the particular variant meme to root meme 402 or other variant memes; how long one or more memes have been in existence overall or with respect to specific platforms; a number of variants associated with the particular meme variant that are classified in the same category (e.g., subculture) of the particular meme variant; a similarity of visual, text, or audio attributes between variant memes and the particular meme variant and/or between the root meme and the particular meme variant; a popularity and/or virality of one or more of the memes in relation to the particular variant meme; and/or based on any other suitable characteristics; or any suitable combination thereof. For example, the system may determine that "Ethnic Variant" meme 408 has been posted or shared more times across one or more social media platforms or other platforms (or the current social media platform a user is accessing) as compared to "Student Variant" meme 412, and this may cause "Ethnic Variant" meme 408 to be located higher in data structure 400 and/or be stored or displayed closer to root meme 402 within data structure 400.

Figure 5:
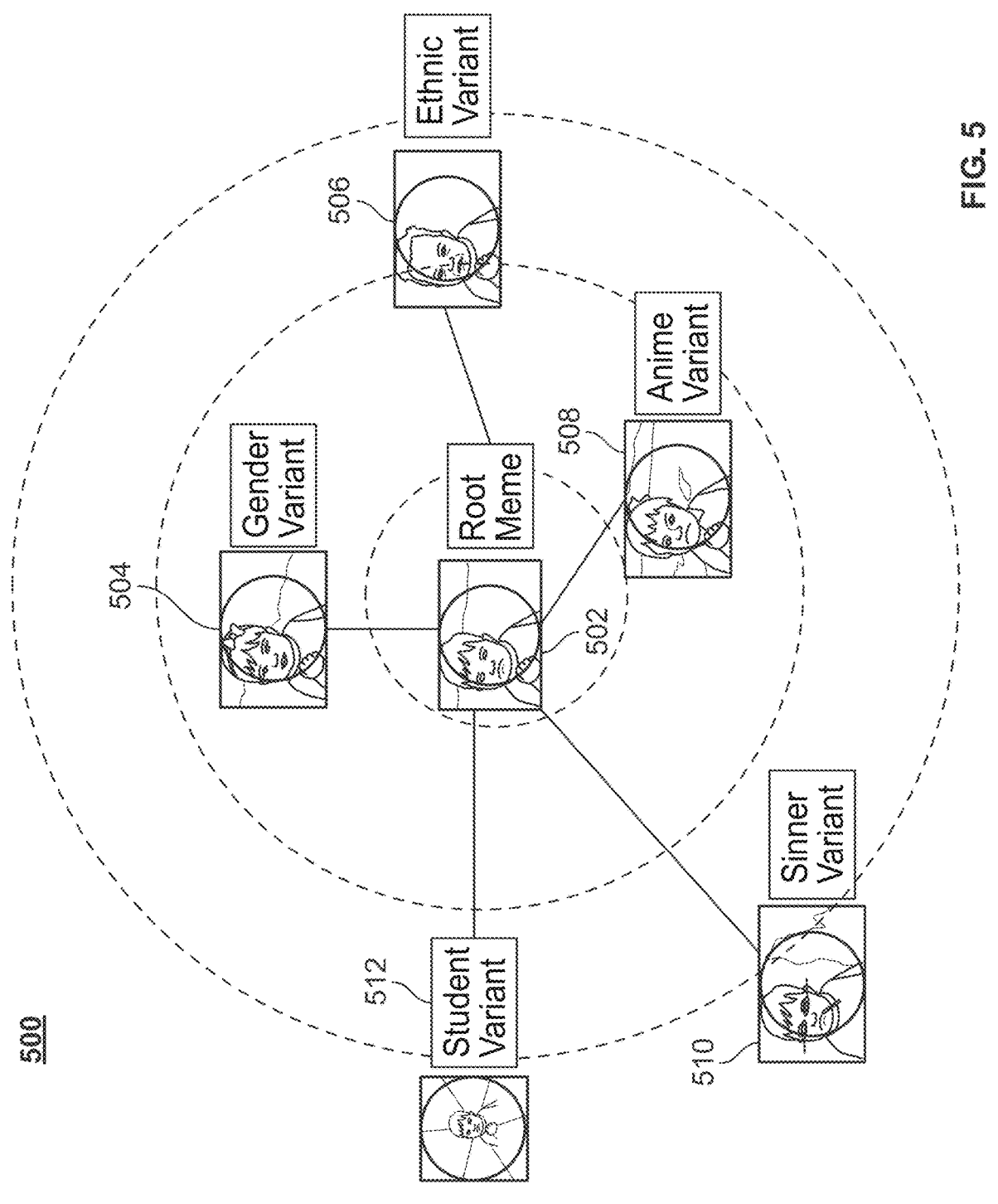
FIG. 5 shows an illustrative meme data structure, in accordance with some embodiments of this disclosure.

In some embodiments, a distance between a particular root meme and a particular variant meme of the plurality of memes in the graph data structure (or any other suitable data structure) corresponding to data structure 400, or 500 of FIG. 5, may be indicative of a degree of similarity between a category of the particular root meme (e.g., root meme 502) and a category of the particular variant meme (e.g., variant meme 510). For example, a category (e.g., subculture) associated with variant meme 504 (e.g., excited female toddler with no text and dark beach background) may be more closely related to the category or subculture of root meme 502 (e.g., excited male toddler with no text and bright beach background) than variant meme 510 (e.g., evil toddler augmented with flames and evil eyes and including text).

In some embodiments, subculture's domains may have hierarchical tree structures organized in terms of popularity, e.g., with most viral memes sitting at the top of the structure, or other prominent portion of the structure, and other memes organized in terms of their virality and/or tenure and/or age on the platform(s). In some embodiments, data structure 400 may be dynamic such that as the virality of the memes change, the system may update their positions, locations, or places within data structure 400 (e.g., on the hierarchical tree). In some embodiments, users may also be assigned a subculture attribute based on their post history, and the system may, if a user is searching for a specific meme to post on the platform, identify a category or subculture that is most aligned with their profile, and the system may recommend or auto-populate memes most aligned with the user's profile. In some embodiments, data structure 400 may be sorted based on the subculture score of the meme, which may enable traversal of data structure 400 from the strongest to weakest association with a particular category or subculture. In some embodiments, virality may enable social platform users to traverse the tree as quickly as possible for them to find the top meme for the subculture they belong to or their post intends to influence. The system may determine, for a meme and/or variants thereof that are getting stronger (e.g., gaining a large number of user-generated variants in a short period of time), and/or gravitating towards a particular subculture, that such meme and/or its variants are gaining in popularity.

FIG. 5 shows an illustrative meme data structure 500, in accordance with some embodiments of this disclosure. Meme data structure 500 may be implemented in addition or in the alternative to data structure 400. Memes 502, 504, 506, 508, 510, and 512 may correspond to memes 402, 404, 406, 408, 410, and 412 of FIG. 4, respectively. In meme data structure 500, root meme 502 may be at the center of data structure 500, and may be surrounded by variant memes thereof, e.g., in a spokes-of-a-wheel arrangement. In some embodiments, as variant memes of root meme 502 are identified and added to data structure 500, such variant memes may be saved to data structure 500 based on one or more of a variety of factors. For example, "Gender Variant" meme 504 may be identified by the system as a variant of root meme 502, and the primary differences between such memes may be identified as a change to the baby's gender and the background (and/or clothes of the baby and a darker background portion) as compared to root meme 502. The system may determine that such differences are minimal as compared to "Sinner Variant" meme 510, in which the baby's eyes and a portion of the background resemble flame (and text has been added), and thus "Gender Variant" meme 504 may be depicted and/or stored at a location or position of data structure 500 that is closer to a center of the data structure at which root meme 502 is depicted and/or stored (as compared to "Sinner Variant" meme 510).

In some embodiments, data structure 400 and/or 500 may comprise, or be a part of, a plurality of data structures, where each respective data structure of the plurality of data structures corresponds to a respective category (e.g., subculture) of a plurality of categories of memes. In some embodiments, each of such data structures may be organized based at least in part on popularities of memes associated with the respective category. In some embodiments, the system may determine a distance between nodes in different data structures for different categories of memes. For example, subcultures may additionally or alternatively be mapped using a graph structure in which memes associated with a particular category or subculture may be grouped into clusters, e.g., based on a meme's subculture strength score. The system may provide the graph structure to determine how close a meme should be to a center node of a subculture or other category. The data structure, e.g., comprising a graph mapping, may enable measurement of the similarity between the memes in terms of their distance from their assigned subculture versus an adjacent subculture. Such features may enable a determination as to whether a meme subvariant is shifting from one subculture to another. In some embodiments, edges in the data structure may represent metadata that is common between the meme variants.

In some embodiments, the system may determine and observe a shift in a subculture's (or other categories') identity over time by tracking how the memes are evolving over time. For example, as the nodes of memes that belong to a subculture get closer and closer to each other, the system may determine that a group identity of this subculture is very strong, and such data may be recorded as a parameter (e.g., time-sensitive metadata) related to the subculture or other category. Such parameter may be leveraged downstream by passing the subculture data to a supplemental content provider (e.g., an advertisement platform). On the other hand, if the system determines that the meme nodes for a subculture or category are relatively far apart and/or are moving even farther away from each other (e.g., via decay) over time, the system may determine that the identity and strength of the subculture is weakening. The system may, upon determining that this trend persists over time based on tracking the graph data structure, identify one or more memes that may contribute to the nodes being pulled further towards each other. If such a meme (e.g., a variant meme or a root meme) is identified during, for example, an embedding phase associated with second machine learning model 107 of FIG. 1, the system may assign a higher weighting to such meme in the data structure and place data representative of such meme at a higher or more prominent node.

Figure 6:
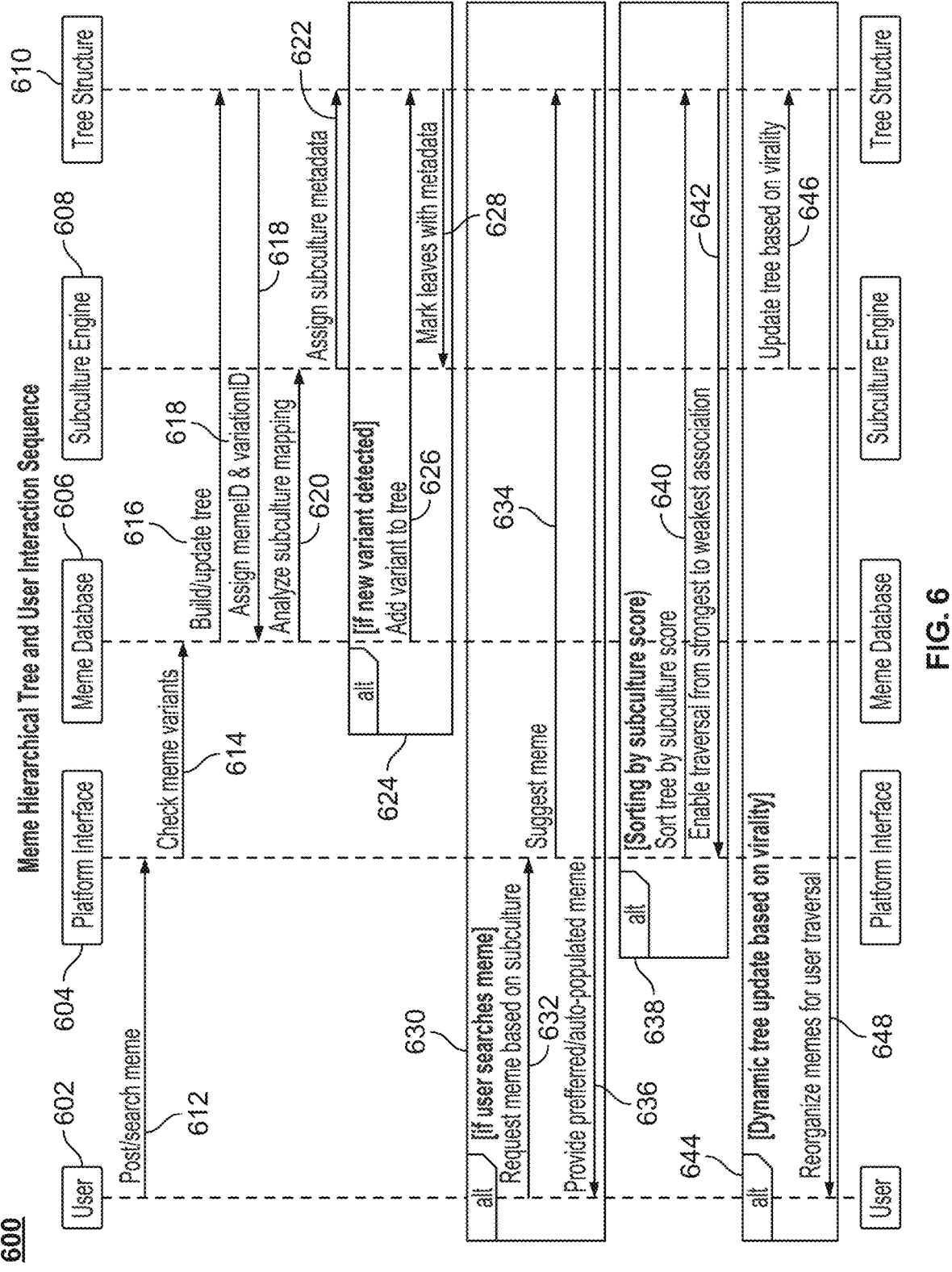
FIG. 6 shows a sequence diagram for a using a meme data structure to track meme history, evolution, and mutation, in accordance with some embodiments of this disclosure.

In some embodiments, supplemental content (e.g., supplemental content 112, 114 of FIG. 1) may be organized in similar data structures as described in FIGS. 5 and 6. For example, similar or different versions of supplemental content items (e.g., advertisements) may be organized based at least in part on a popularity of the supplemental content, attributes (e.g., visual and/or textual and/or audio content) of the supplemental content, a category associated with the supplemental content, a number of times the supplemental content has been inserted on a particular platform or across multiple platforms, a level of engagement of users with the supplemental content, a particular company or brand associated with the supplemental content, and/or any other suitable factors. For example, "Office Depot" associated with supplemental content 112 may be associated with a particular data structure in which its supplemental content is organized in a hierarchical tree structure or spokes-of-a-wheel arrangement as described in FIGS. 5 and 6, and/or supplemental content related to category 108 of "working professionals" may be organized in a hierarchical tree structure or spokes-of-a-wheel arrangement as described in FIGS. 5 and 6. Such organization may, for example, facilitate better dynamic supplemental content insertion for differing subcultures.

FIG. 6 shows a sequence diagram 600 for using a meme data structure to track meme history, evolution, and mutation, in accordance with some embodiments of this disclosure. At 612, the system may receive, from user 602, a post or a search or other input associated with a meme via platform interface 604. At 614, the system may check for meme variants and/or a root meme (related to the meme associated with 612) stored in the meme database 606. At 616, the system may construct and/or update data structure 610. In some embodiments, meme database 606 and data structure 610 may be included as part of data structure 109 of FIG. 1.

At 618, the system may assign a meme ID (e.g., an ID of the associated root meme 402 of FIG. 4) and a variation ID to the meme associated with 612 (e.g., meme 408 of FIG. 4). At 620, the system may analyze category or subculture mapping stored at meme database 608, and at 622, use subculture engine 608 to assign category or subculture metadata to a portion of data structure 610 representative of the meme associated with 612 (e.g., meme 408 of FIG. 4). At 624, the system may determine whether such meme is a new variant; if so, at 626, the system may add such new meme variant to meme database 606, and mark portions (e.g., leaves) of the data structure with metadata. At 628, the system may provide marked leaves with metadata to subculture engine 608.

At 630, the system may determine whether a request has been received from user 602 to access or request a meme, and whether such request is a request for a meme associated with a subculture or other category (at 632). At 634, the system may cause platform interface 604 to suggest a meme for which data associated with the meme is stored in data structure 610. At 636, the system may retrieve, from data structure 610, a preferred meme for user selection or auto-populate such meme to a display being accessed by user 602.

At 640, the system may sort data structure 610 by subculture score, and at 642, the system may enable traversal (e.g., by user 602 via a user input interface or by a computer) from a strongest to weakest association in relation to a particular subculture or other category. At 644 and 646, data structure 610 may be dynamically updated based on virality of one or more memes, e.g., based on monitoring how often a root meme and/or variants thereof are shared or posted on a particular social media platform and/or other platforms. At 648, the system may reorganize memes for traversal by user 602, e.g., based on the determined time-based virality.

Figure 7:
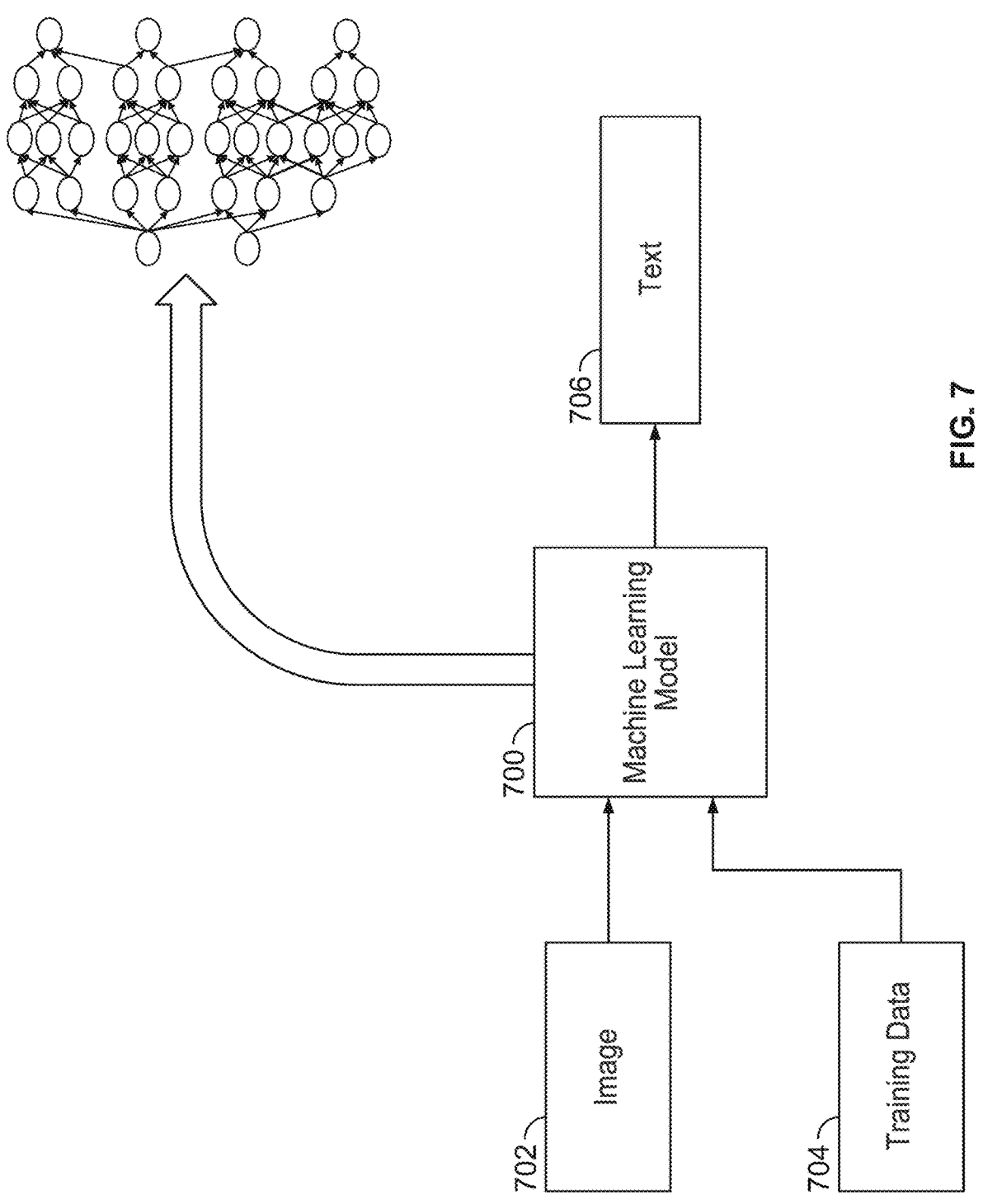
FIGS. 7 and 8 show block diagrams of illustrative machine learning models, in accordance with some embodiments of this disclosure.
Figure 8:
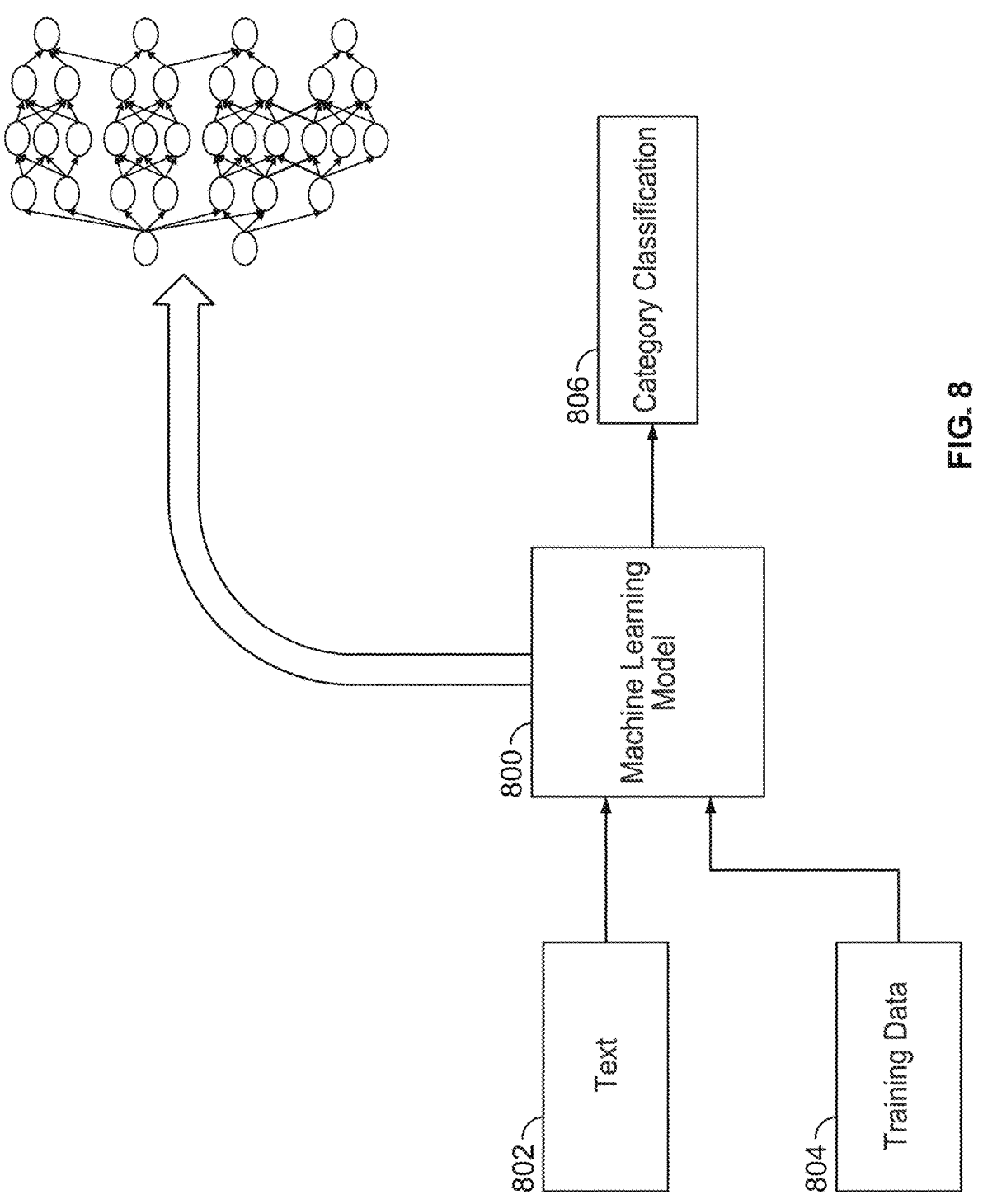

FIGS. 7 and 8 show block diagrams of illustrative machine learning models 700 and 800, in accordance with some embodiments of this disclosure. In some embodiments, machine learning models 700 and/or 800 of FIGS. 7 and 8 may be, for example: an LLM, neural network, a recurrent neural network, a convolutional neural network, an image encoder, a text encoder, a transformer, a classifier, or any other suitable type of machine learning or artificial intelligence model or any combination thereof.

In some embodiments, one or more of machine learning models 700 and/or 800 may be implemented based at least in part on the techniques described in Ramesh et al., "Zero-Shot Text-to-Image Generation," Proceedings of the 38$^{th}$ International Conference on Machine Learning, PMLR 139: 8821-8831, 2021," the contents of which is hereby incorporated by reference herein in its entirety. In some embodiments, one or more of machine learning models 700 and/or 800 may be implemented based at least in part on the techniques described in Ramesh et al., "Hierarchical text-conditional image generation with clip latents." arXiv preprint arXiv: 2204.06125 (2022), the contents of which is hereby incorporated by reference herein in its entirety. In some embodiments, one or more of machine learning models 700 and/or 800 may be implemented based at least in part on the techniques described in Radford et al., "Learning Transferable Visual Models From Natural Language Supervision," PMLR 139:8748-8763, 2021, the contents of which is hereby incorporated by reference herein in its entirety.

Machine learning model 700 may be configured to receive one or more images 702 (e.g., of one or more portions of meme 103 of FIG. 1), and based on such input(s), machine learning model 700 may output text 706 (e.g., a natural language description 106 of FIG. 1). For example, machine learning model 700 may be trained using training data 704 to receive as input data corresponding to a meme 103 (e.g., a "Distracted Boyfriend" meme 115 in FIG. 1) and output text, e.g., natural language description 706. Training data 704 may comprise a large number of text-image pairs from one or more sources, e.g., the Internet, one or more databases, and/or any other suitable source.

Machine learning model 700 may be configured to receive text 706 (e.g., metadata of, or a natural language description of, one or more portions of a meme), and based on such input(s), machine learning model 700 may output category classification (e.g., a category classification corresponding to the input text 702). Training data 704 may comprise a large number of natural language description and category label pairs from one or more sources, e.g., the Internet, one or more databases, and/or any other suitable source.

In some embodiments, machine learning models 700 and 800 may be generated using training data 704 and 804, e.g., using an iterative process of adjusting weights (and/or other parameters) for one or more layers of the machine learning model(s), based on comparing outputs during training to ground truth values (e.g., annotated indications of the correct or desired outputs for given input(s)). In some embodiments, the system may then adjust weights or other parameters of the machine learning models being trained based on how closely the output corresponds to the ground truth value. In some embodiments, the training process may be repeated until results stop improving or until a certain performance level is achieved (e.g., until 95% accuracy is achieved, or any other suitable accuracy level or other metrics are achieved).

Machine learning model 700 (and 800), input data 702 and 802, training data 704 (and 804), and/or outputs 706 and 806 may be stored in any suitable device(s) and/or server(s) of the system. Machine learning model 700 (and 800) may be implemented at any suitable device(s) and/or server(s) of the system.

In some embodiments, model 700 (and 800) may be trained to learn features and patterns with respect to particular features of image or text inputs (e.g., certain types or categories of images or text) and corresponding representations thereof. Such learned patterns and inferences may be applied to received data, once model 700 (and 800) is trained. In some embodiments, the models may continue to be trained on the fly or may be adjusted on the fly for continuous improvement, based on input data and inferences or patterns drawn from the input data, and/or based on comparisons after a particular number of cycles and/or based on feedback received from a user. In some embodiments, model 700 (and 800) may be content-independent or content-dependent, e.g., may continuously improve with respect to certain types of content. In some embodiments, 700 (and 800) may comprise any suitable number of parameters.

In some embodiments, machine learning model 700 (and 800) may be trained by way of unsupervised learning, e.g., to recognize and learn patterns based on unlabeled data. In some embodiments, machine learning model 700 (and 800) may be trained by supervised training with labeled training examples to help the model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using back-propagation techniques, and/or any other suitable techniques). In some embodiments, the nature of the connections may enable or inhibit certain nodes of the network. In some embodiments, the system may be configured to receive (e.g., prior to training) user specification of (or automatic selection of) hyperparameters (e.g., a number of layers and/or nodes or neurons in each model). The system may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized metadata attributes stored in conjunction with or appended to the training image data. Any suitable network training patch size and batch size may be employed for training model 700 (and 800). In some embodiments, model 700 (and 800) may be trained at least in part using a feedback loop, e.g., to help learn user preferences over time.

In some embodiments, the system may perform any suitable preprocessing steps with respect to training data, and/or data to be input to the trained machine learning model. For example, preprocessing may include causing an image that is to be input to be of a particular size or resolution. In some embodiments, preprocessing may include causing text that is to be input to be of a particular size or format. In some embodiments, preprocessing may include, for example, extracting suitable features from the training images and converting the features into a suitable numerical representation (e.g., one or more vector(s) and/or one or more matrices); normalization; resizing; minimization; brightening portions thereof; darkening portions thereof; color shifting the image among color schemes from color to grayscale; other mapping; cropping the image; scaling the image; adjusting an aspect ratio of the image; adjusting contrast of an image; and/or performing any other suitable operating on or manipulating of the image data; or any combination thereof. In some embodiments, the image capture system may preprocess image or text data to be input to the trained machine learning model, to cause a format of the input image or text data to match the formatting of the training data, or any other suitable processing may be performed, or any combination thereof.

In some embodiments, machine learning model 700 (and 800) may be trained "offline" (e.g., using labeled data) such as, for example, at a server (e.g., server 1004 of FIG. 10) remote from a computing device at which input is received, or at a third party. In some embodiments, model 700 (and 800) may be implemented at such remote server, and/or abstracted by the system (for example, as a set of weights or biases applied to a neural network) and transmitted (e.g., over network 1009 of FIG. 10) to a user's computing devices, e.g., having the system installed or implemented thereon or provided thereto. For example, the local computing device may lack computational and/or storage resources to train the model from scratch. In some embodiments, each device may iteratively improve the machine learning model 700 (and 800) locally and send the abstracted model and/or updates back to the server. In some embodiments, the user's computing devices may be configured to locally implement machine learning model 700 (and 800).

Figure 9:
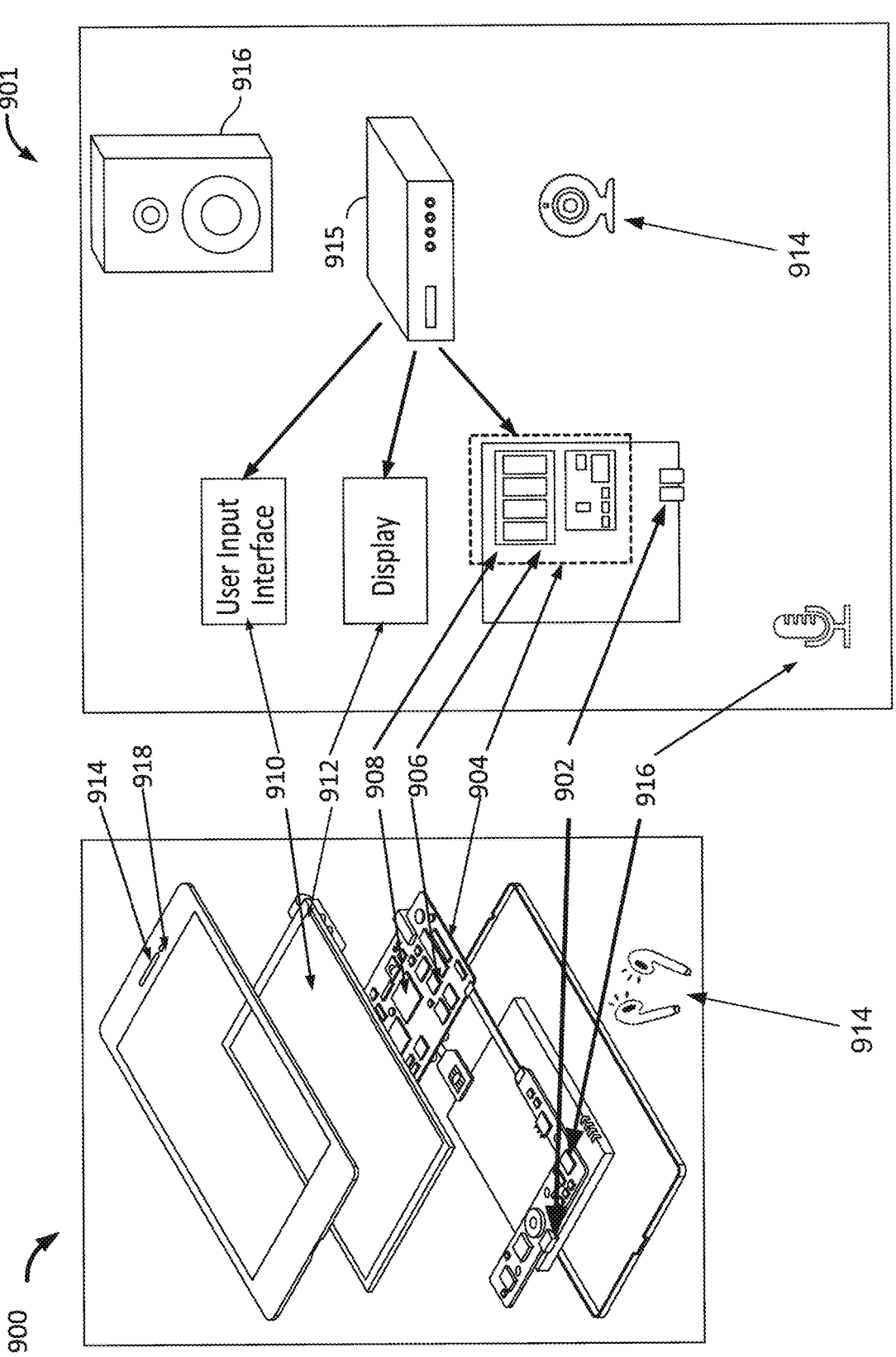
FIGS. 9 and 10 show illustrative devices, systems, servers, and related hardware, in accordance with some embodiments of this disclosure.
Figure 10:
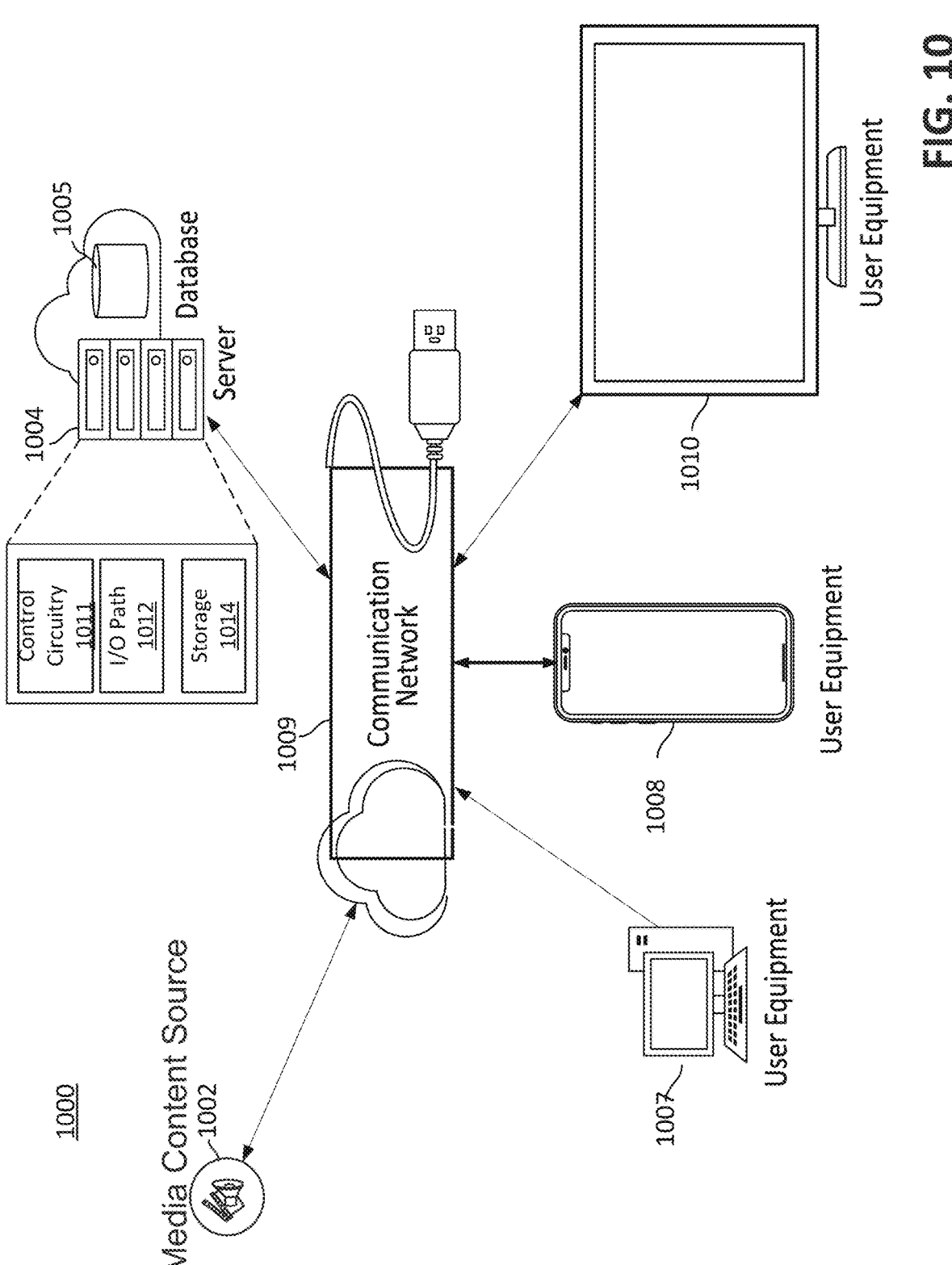

FIGS. 9-10 show illustrative devices, systems, servers, and related hardware for generating a multi-layer image, in accordance with some embodiments of this disclosure. FIG. 9 shows generalized embodiments of illustrative computing devices 900 and 901, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR HMD; a VR HMD; or any other suitable computing device; or any combination thereof. In another example, computing device 901 may be a user television equipment system or device.

User television equipment device 901 may include set-top box 915. Set-top box 915 may be communicatively connected to microphone 916, Audio output equipment (e.g., speaker or headphones 914), and display 912. In some embodiments, microphone 916 may receive audio corresponding to a voice of a user providing input. In some embodiments, display 912 may be a television display or a computer display. In some embodiments, set-top box 915 may be communicatively connected to user input interface 910. In some embodiments, user input interface 910 may be a remote control device. Set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 10. In some embodiments, computing device 900 may comprise any suitable number of sensors (e.g., gyroscope or accelerometer, etc.), and/or a GPS module (e.g., in communication with one or more servers and/or cell towers and/or satellites) to ascertain a location of computing device 900. In some embodiments, computing device 900 comprises a rechargeable battery that is configured to provide power to the components of the device.

Each one of computing device 900 and computing device 901 may receive content and data via input/output (I/O) path 902. I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. Control circuitry 904 may be used to send and receive commands, requests, and other suitable data using I/O path 902, which may comprise I/O circuitry. I/O path 902 may connect control circuitry 904 (and specifically processing circuitry 906) to one or more communications paths (described below). I/O functions may be provided by one or more of these communications paths, but are shown as a single path in FIG. 10 to avoid over-complicating the drawing. While set-top box 915 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., computing device 900), an XR device; a tablet; a network-based server hosting a user-accessible client device; a non-user-owned device; any other suitable device; or any combination thereof.

Control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for the system or application stored in memory (e.g., storage 908). Specifically, control circuitry

904 may be instructed by the system or application to perform the functions discussed above and below. In some implementations, processing or actions performed by control circuitry 904 may be based on instructions received from the system or application.

In client/server-based embodiments, control circuitry 904 may include communications circuitry suitable for communicating with a server or other networks or servers. The system or application may be a stand-alone application implemented on a device or a server. The system or application may be implemented as software or a set of executable instructions. The instructions for performing any of the embodiments discussed herein of the system or application may be encoded on non-transitory computer-readable media (e.g., a hard drive, random-access memory on a DRAM integrated circuit, read-only memory on a BLU-RAY disk, etc.). For example, the instructions may be stored in storage 908, and executed by control circuitry 904 of a computing device 900.

In some embodiments, the system or application may be a client/server application where only the client application resides on device 900 (e.g., computing device 102), and a server application resides on an external server (e.g., server 1004). For example, the system or application may be implemented partially as a client application on control circuitry 904 of device 900 and partially on server 1004 as a server application running on control circuitry 1011. Server 1004 may be a part of a local area network with one or more of computing devices 900, 901 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1004 and/or an edge computing device), referred to as "the cloud." Device 900 may be a cloud client that relies on the cloud computing capabilities from server 1004 to determine whether processing should be offloaded from the mobile device, and facilitate such offloading. When executed by control circuitry of server 1004, the system or application may instruct control circuitry 1011 to perform processing tasks for the client device and facilitate the analysis of memes and provision of supplemental content. The client application may instruct control circuitry 904 to determine whether processing should be offloaded. In some embodiments, data structure 109 of FIG. 1, data structure 400 of FIG. 4, data structure 500 of FIG. 5, meme database 606 of FIG. 6, and/or data structure 610 of FIG. 6 may be located at or stored in media content source 1002, server 1004 and/or database 1005 and/or at computing device 1007, 1008 and/or 1010.

Control circuitry 904 may include communications circuitry suitable for communicating with a server, edge computing systems and devices, a table or database server, or other networks or servers The instructions for carrying out the above mentioned functionality may be stored on a server (which is described in more detail in connection with FIG. 10. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 10). In addition, communications circuitry may include circuitry that enables peer-to-peer communication of computing devices, or communication of computing devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as the system or application data described above. Nonvolatile memory may also be used (e.g., to launch a boot-up routine and other instructions). Cloud-based storage, described in more detail in relation to FIG. 10, may be used to supplement storage 908 or instead of storage 908.

Control circuitry 904 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and downconverting content into the preferred output format of computing device 900. Control circuitry 904 may also include digital-to-analog converter circuitry and analog-to-digital converter circuitry for converting between digital and analog signals. The tuning and encoding circuitry may be used by computing device 900, 901 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from computing device 900, the tuning encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of computing device 900 and computing device 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of computing device 900 and computing device 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters, words, terms, or numbers that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The system or application may be implemented using any suitable architecture. For example, it may be a stand-alone application wholly-implemented on each one of computing device 900 and computing device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to provide the functionality, and generate any of the displays, discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected.

An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, historical interactions by the user, and/or any other suitable data. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the system or application is a client/server-based application. Data for use by a thick or thin client implemented on each one of computing device 900 and computing device 901 may be retrieved on-demand by issuing requests to a server remote to each one of computing device 900 and computing device 901. For example, the remote server may store the instructions for the application in a storage device. The remote server may process the stored instructions using circuitry (e.g., control circuitry 904) and generate the displays discussed above and below. The client device may receive the displays generated by the remote server and may display the content of the displays locally on computing device 900. This way, the processing of the instructions is performed remotely by the server while the resulting displays (e.g., that may include text, a keyboard, or other visuals) are provided locally on computing device 900. Computing device 900 may receive inputs from the user via input interface 910 and transmit those inputs to the remote server for processing and generating the corresponding displays. For example, computing device 900 may transmit a communication to the remote server indicating that an up/down button was selected via input interface 910. The remote server may process instructions in accordance with that input and generate a display of the application corresponding to the input (e.g., a display that moves a cursor up/down). The generated display is then transmitted to computing device 900 for presentation to the user.

In some embodiments, the system or application may be downloaded and interpreted or otherwise run by an interpreter or virtual machine (run by control circuitry 904). In some embodiments, system or application may be encoded in the ETV Binary Interchange Format (EBIF), received by control circuitry 904 as part of a suitable feed, and interpreted by a user agent running on control circuitry 904. For example, the system or application may be an EBIF application. In some embodiments, the system or application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), the system or application may be, for example, encoded and transmitted in an MPEG-2 object carousel with the MPEG audio and video packets of a program.

FIG. 10 is a diagram of an illustrative system 1000, in accordance with some embodiments of this disclosure.

Computing devices 1007, 1008, 1010 (which may correspond to, e.g., computing device 900 or 901) may be coupled to communication network 1009.

Communication network 1009 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 302-11x, etc.), or other short-range communication via wired or wireless paths. The computing devices may also communicate with each other directly through an indirect path via communication network 1009.

System 1000 may comprise media content source 1002, one or more servers 1004, and/or one or more edge computing devices. In some embodiments, system or application may be executed at one or more of control circuitry 1011 of server 1004 (and/or control circuitry of computing devices 1007, 1008, 1010 and/or control circuitry of one or more edge computing devices). In some embodiments, the media content source and/or server 1004 may be configured to host or otherwise facilitate video communication sessions between computing devices 1007, 1008, 1010 and/or any other suitable computing devices, and/or host or otherwise be in communication (e.g., over network 1009) with one or more social network services.

In some embodiments, server 1004 may include control circuitry 1011 and storage 1014 (e.g., RAM, ROM, Hard Disk, Removable Disk, etc.). Storage 1014 may store one or more databases. Server 1004 may also include an input/output path 1012. I/O path 1012 may provide meme data natural language descriptions, machine learning model inputs and/or outputs, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

Figure 11:
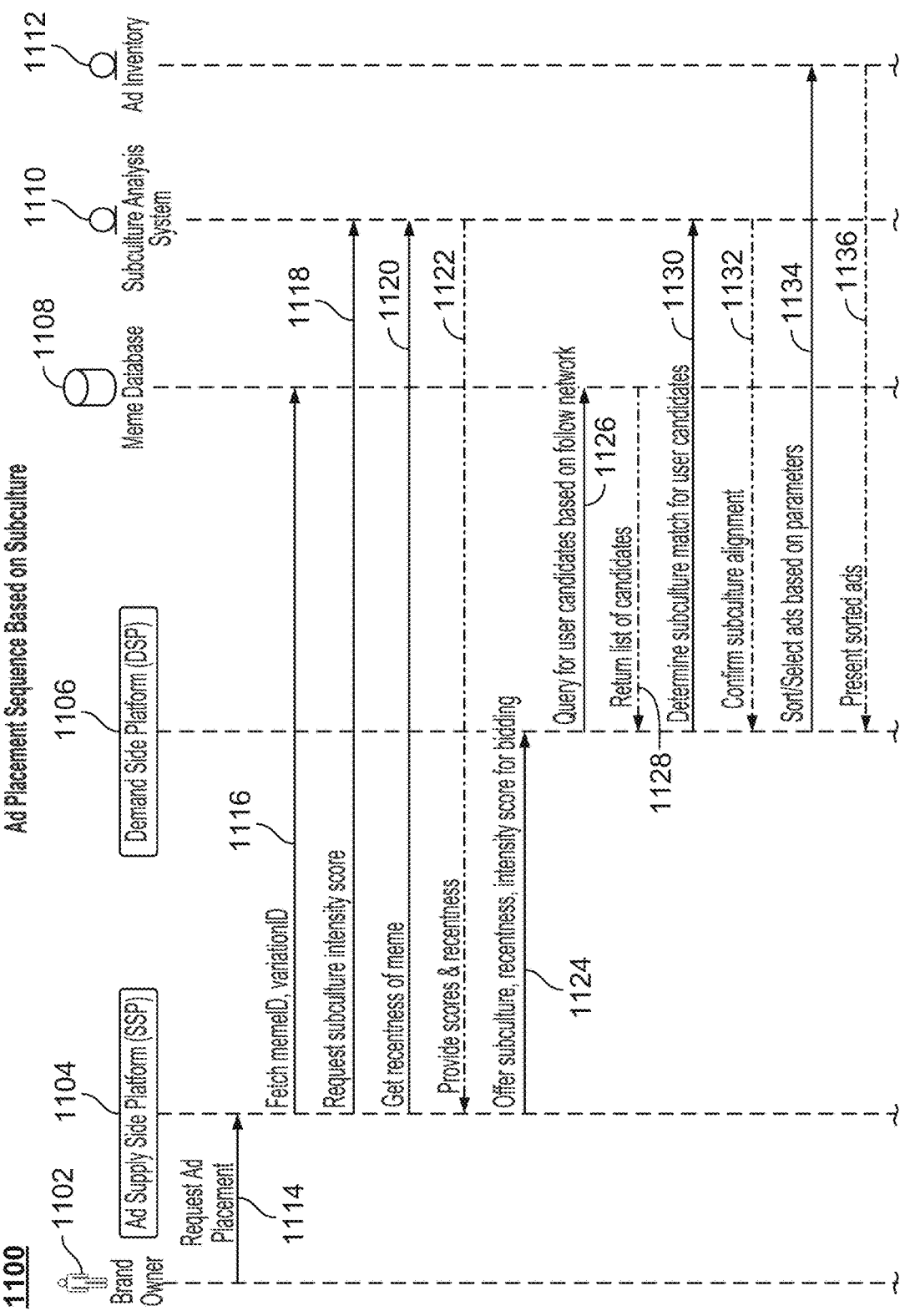
FIG. 11 shows a sequence diagram for supplemental content placement based on a category of a meme, in accordance with some embodiments of this disclosure.
Figure 11:
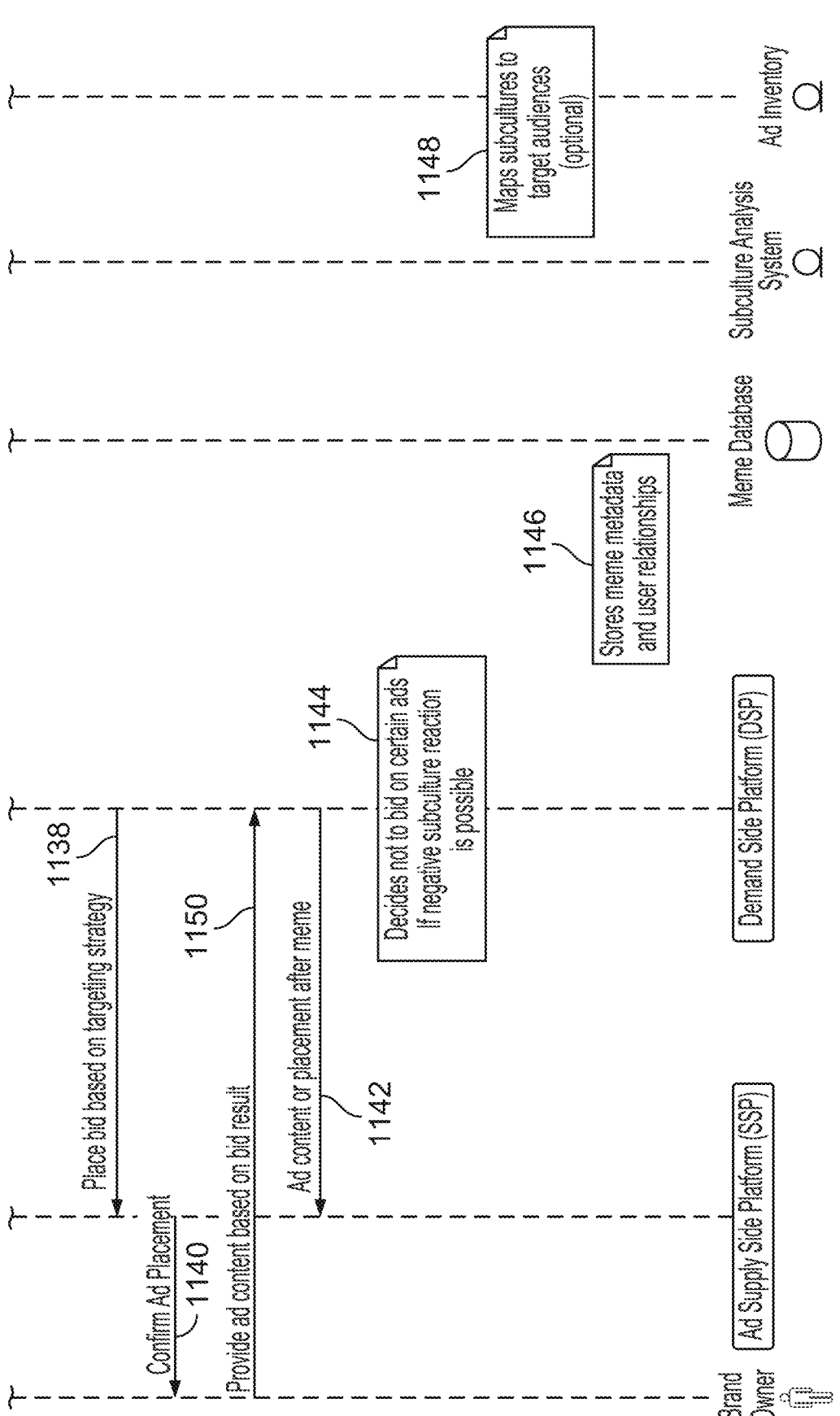

FIG. 11 shows a process 1100 for supplemental content placement based on a category of a meme, in accordance with some embodiments of this disclosure. In various embodiments, the individual steps of process 1100 may be implemented by one or more components of the devices, methods, and systems of FIGS. 1-10 and 12-14 may be performed in combination with any of the other processes and aspects described herein. Although the present disclosure may describe certain steps of process 1100 (and of other processes described herein) as being implemented by certain components of the devices, methods, and systems of FIGS. 1-10 and 12-14, this is for purposes of illustration only, and it should be understood that other components of the devices, methods, and systems of FIGS. 1-10 and 12-14 may implement those steps instead.

Process 1100 may enable strategic association and mapping of supplemental content (e.g., advertisements) to memes at their peak virality, e.g., to cause supplemental content to be placed in a social media feed after a user had just been presented with a meme that is relevant to such supplemental content. For example, advertising campaigns often are looking for an age/demographic group, and a particular product that they are looking to promote to such age/demographic group. Using the techniques described herein to determine a topic or category of a particular meme (e.g., displayed at a social media platform), the system may identify a product that a brand is likely to be interested in advertising that is related to such topic or category of the particular meme. In some embodiments, a social media post associated with the particular meme may impact the category or topic of the particular meme.

In some embodiments, the system may comprise, or be in communication with, one or more of brand owner 1102, supply side platform (SSP) 1104, demand side platform (DSP) 1106, meme database 1108, subculture analysis system 1110, and ad inventory 1112. In some embodiments, meme database 1108 may be hosted on a data management platform (DMP) of an ad ecosystem. In some embodiments, one or more of such entities may be considered to be part of an ecosystem of one or more supplemental content providers, and/or a social media platform may, in some embodiments, be integrated with or comprise or be in communication with a supplemental content provider.

At 1114, brand owner 1102 may request placement of supplemental content placement from SSP 1104. At 1116, SSP 1104 may fetch a meme ID and variant ID from meme database 1108, e.g., for a meme identified for presentation at a social media platform. At 1118, SSP 1104 may request a subculture score from subculture analysis system 1110 and, at 1120, may obtain a recentness of the meme from subculture analysis system 1110. At 1122, subculture analysis system 1110 may provide scores and recentness to SSP 1104. At 1124, SSP 1104 offers subculture, recentness, and intensity scores for bidding to DSP 1106. For example, such features enable the system to set the subculture as a new parameter (in addition to the meme ID, variation ID, meme's subculture intensity score, and/or subculture strength) offered by SSP 1104 during a bidding process to a DSP, which may provide enhanced population targeting capabilities for brand owners. While subculture value of a meme may be offered by SSP 1104 to DSP 1106, as discussed at 1124, the recentness of the meme may also be presented as a parameter, and DSP 1106 may use that option to sort ads in its inventory or during the bid process regarding the urgency of the ad campaign.

At 1126, DSP 1106 may query meme database 1108 for user candidates based on a follow network of the user, e.g., on a social media platform (e.g., how many social platform users who are candidates to see the meme) and whether they belong to the subculture that the meme is assigned to. Such features provide DSP 1106 the ability to strategically place their ads right after specific subculture memes for certain social platform users, taking advantage of the meme group thinking while at the same time offering individualization. Alternatively, the system may map the subculture to the particular target audience that the brand is looking to reach. For instance, if the subculture is Swifties, this group might be mapped to a primarily white 13-28 age range female population. In some embodiments, the subculture may cover a more granular and broader segment of the population. For example, DSP 1106 may decide not to bid on ad slots that they may have otherwise bid on, based on receiving information regarding subcultures the supplemental content would reach, particularly if the supplemental content is likely to receive a negative reaction from a specific subculture.

At 1128, meme database 1108 may return to DSP 1106 a list of candidates. At 1130, DSP 1106 may determine a subculture match for such candidates and provide a subculture match for the user candidates to subculture analysis system 1110. At 1132, subculture analysis system 1110 may confirm with DSP 1106 subculture alignment. At 1134, DSP 1106 may sort/select supplemental content at supplemental content inventory 1112 (e.g., advertisement inventory) based on parameters. At 1136, supplemental content inventory 1112 may present sorted supplemental content to DSP 1106.

At 1138, DSP 1106 may place a bid with SSP 1104 based on a targeting strategy. At 1140, SSP 1104 confirms with brand owner 1102 placement of supplemental content. At 1150, brand owner 1102 may provide supplemental content to the DSP 1106 based on bid result. At 1142, DSP 1106 may provide supplemental content for placement after meme to the supplemental content provider 1104. In some embodiments, at 1144, DSP 1106 may decide not to bid on certain supplemental content if a negative subculture reaction is possible or likely. For example, the system may determine that a particular brand owner 1102 has indicated it does not want to be associated with a meme having a category with possible offensive content (e.g., inappropriate, racist, sexist, or otherwise offensive), and thus the system may refrain from bidding on providing supplemental content in relation to offensive memes for such brand owner 1102, and minimize or avoid supplemental content being inadvertently placed near an offensive meme. For example, the system may determine that a meme and its variants have taken a negative turn (e.g., objectionable text that may reflect poorly on a brand or supplemental content provider), to allow the brand to avoid placing supplemental content in a vicinity of such a meme or its variants. In some embodiments, supplemental content may be provided based at least in part on determining that the supplemental content does not correspond to a particular category or subculture indicated by a supplemental content provider's preferences as undesirable.

At 1146, meme database 1108 stores meme metadata and user relationships. In some embodiments, supplemental content may be provided only if the supplemental content is relevant to the meme (determined based on mapping a visual content category of such meme to one or more similar memes having a similar visual content category as indicated in the data structure) and/or only if the meme (and the supplemental content) is likely to be relevant or popular to the user, and/or to users more generally. This enables conserving the computing and/or networking resources of supplemental content providers, by having supplemental content, in relation to a meme, be provided for display with such meme if certain conditions are met, e.g., indicating the meme and supplemental content are likely of interest to the user.

At 1148, supplemental content inventory 1112 maps the subculture to target audiences, e.g., provides supplemental content having attributes matching demographic attributes of a particular user accessing a platform providing the meme. In some embodiments, more than one category may be associated with the first meme. The supplemental content provider may then choose the category that is of more importance to the supplemental content provider to provide the supplemental content or may identify supplemental content having attributes that match each of, or a subset of, the more than one categories. In some embodiments, during the ad bidding process, SSP 1104 may offer more than one subculture designation for a meme, that DSP 1106 can bid based on what subculture is more important for a brand 1104 to reach, to allow supplemental content to be placed and displayed at the right time to the right audience to maximize engagement with and influence of an advertisement campaign. For example, memes are often particularly popular with young people, and such young people may be targeted when viewing a popular meme by strategically placing supplemental content related to the meme in a vicinity of the meme, to amplify the brand's message in an efficient manner.

In some embodiments, social media platforms or other platforms may open their (pruned) subculture models to brands via API, to provide access to embeddings that may have been used to determine the subculture, which may allow the brands to create meme variants for the subcultures that they are targeting.

In some embodiments, social media platforms or other platforms may open up their subculture graph model via an API and/or user profiles associated with subcultures to an AdTech platform for the brands to track the evolution of the subculture and its node density/decay.

Figure 12:
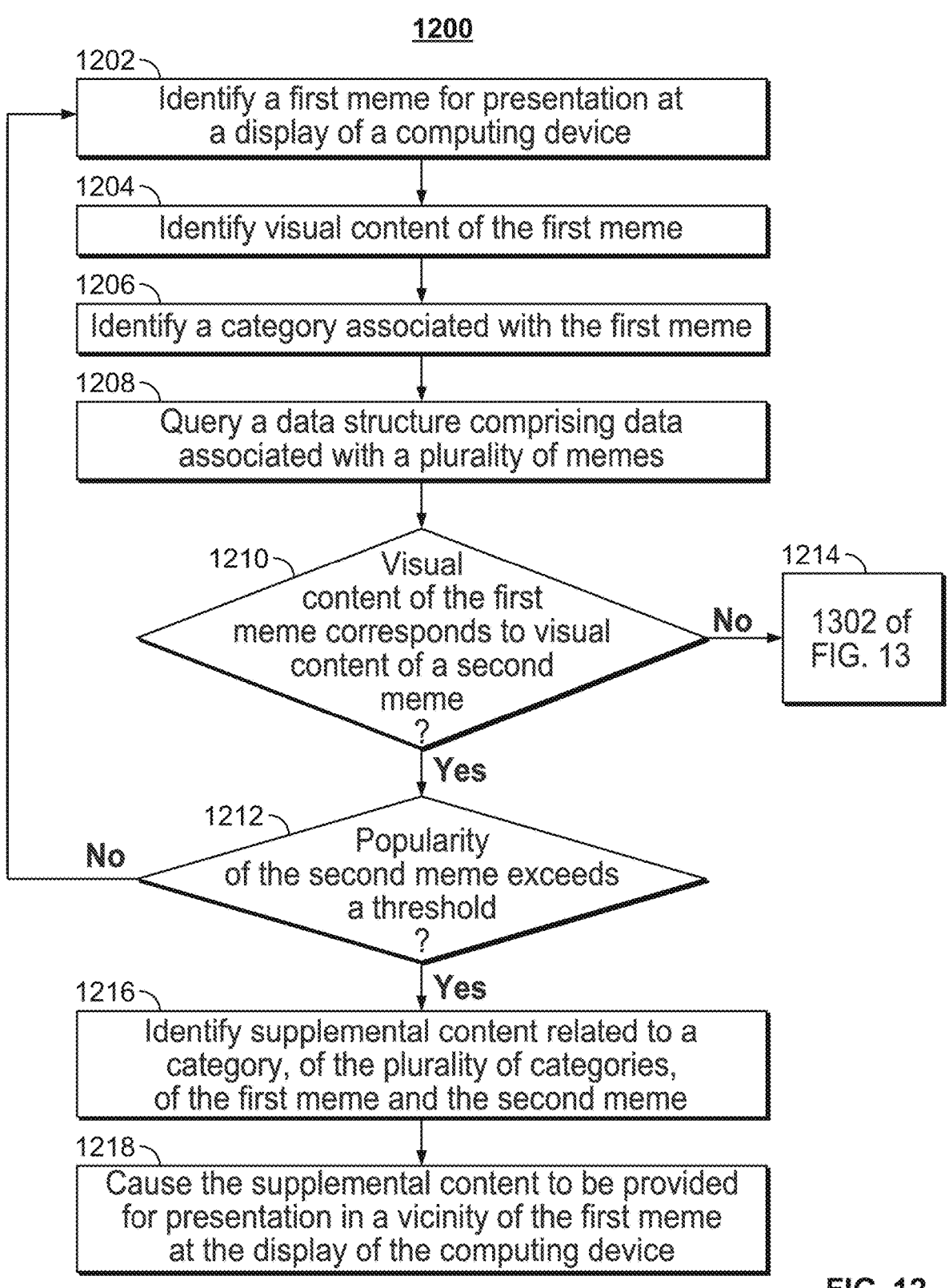
FIG. 12 is a flowchart of an illustrative process for providing supplemental content that is related to a meme, in accordance with some embodiments of this disclosure.

FIG. 12 is a flowchart 1200 of an illustrative process for providing supplemental content that is related to a meme, in accordance with some embodiments of this disclosure. In various embodiments, the individual steps of process 1200 may be implemented by one or more components of the devices, methods, and systems of FIGS. 1-11 and 13-14 and may be performed in combination with any of the other processes and aspects described herein. Although the present disclosure may describe certain steps of process 1200 (and of other processes described herein) as being implemented by certain components of the devices, methods, and systems of FIGS. 1-11 and 13-14, this is for purposes of illustration only, and it should be understood that other components of the devices, methods, and systems of FIGS. 1-11 and 13-14 may implement those steps instead.

At 1202, control circuitry (e.g., control circuitry 904 of FIG. 9 and/or control circuitry 1011 of FIG. 10) may identify a first meme (e.g., meme 103 of FIG. 1) for presentation at a display of a computing device (e.g., computing device 102 of FIG. 1). For example, the first meme may be being provided for display via a social media platform of the computing device to a user (e.g., user 102 of FIG. 1), or may be identified for display based on user input, or buffered or otherwise identified for display should a user scroll down further on the page, perform a particular search or select a particular link or icon.

At 1204, the control circuitry may use any suitable computer-implemented technique to identify visual content associated with the first meme (and/or other content, such as, for example, text, audio, metadata, or any other suitable content associated with the first meme). For example, the control circuitry may use trained machine learning model 105, which may be trained to receive, as input, data indicative of visual content of first meme 103 (and/or other data indicative of text or other portions of first meme 103), and based on such input, trained machine learning model 105 may output natural language descriptions 106 of such visual portions of meme 103 to gain a semantic understanding of meme 103. In some embodiments, metadata of first meme 103 may be used to identify visual and/or text and/or audio content of the meme. In some embodiments, if the meme comprises audio, a transcription of such audio may be obtained and processed to gain a semantic understanding of such audio.

At 1206, the control circuitry may use any suitable computer-implemented technique to identify a category (e.g., a subculture of "working professionals" 108 in FIG. 1) associated with the first meme (e.g., meme 103 of FIG. 1). For example, the control circuitry may use trained machine learning model 107, which may be trained to receive, as input, data associated with natural language description 106 (and/or other data indicative of visual content, text or other portions of first meme 103), and based on such input, trained machine learning model 107 may output category 108 associated with first meme 103. In some embodiments, the control circuitry may compare metadata and/or other data associated with first meme 103 to data in a meme data structure (e.g., data structure 109 of FIG. 1), which may store categories of memes, to determine category 108 for first meme 103.

At 1208, the control circuitry may query a data structure (e.g., meme database 109 of FIG. 1) comprising data associated with a plurality of memes. Such data structure may comprise data associated with a plurality of memes comprising a plurality of root memes (e.g., root meme 115 and root meme 123 of FIG. 1), where each respective root meme of the plurality of root memes may be associated with a plurality of variant memes (e.g., variant meme 125 may be associated with root meme 115 in the data structure) that are variations of the respective root meme. In some embodiments, a portion of the data structure at which a particular variant meme is located, stored, and/or depicted may be indicative of a degree of similarity between the particular variant meme and its corresponding root meme, e.g., variant meme 504 in FIG. 5 is located closer to root meme 502 than variant meme 512, based on sharing more attributes with root meme 502 than variant meme 512. In some embodiments, each subculture or other category may be associated with a respective data structure. In some embodiments, one of more of such data structures may be organized based at least in part on a popularity or virality of a meme.

At 1210, the control circuitry may determine whether visual content of the first meme (e.g., meme 103 of FIG. 1) corresponds to visual content of a second meme. For example, the control circuitry may determine that the first meme (e.g., first meme 103 of FIG. 1) corresponds to a root meme (e.g., root meme 115 of the well known "Distracted Boyfriend" meme) based on similarities between objects (e.g., objects 118, 122, 126) depicted in each of first meme 103 and root meme 115, and/or that first meme 103 corresponds to variant meme 125 (e.g., a variant of root meme 115).

As another example, 1210 may additionally or alternatively comprise the control circuitry checking whether the category of the first meme matches a category associated with a second meme stored in the meme database (e.g., meme database 109 of FIG. 1). As another example, the control circuitry may compare attributes of the first meme to attributes of one or more memes within the same category, or across all categories, within the data structure, to determine whether there is a match (e.g., an exact match, such that meme 103 is already stored in the data structure, or match similarity above a certain threshold, such as, for example, between meme 103 and root meme 115 due to the similar objects and objects locations in each meme). If no correspondence is found between the first meme and a second meme in the data structure, processing may proceed to 1214 (e.g., 1302 of FIG. 13). If a correspondence is found between the first meme and a second meme in the data structure, processing may proceed to 1212. In some embodiments, data associated with meme 103 may be added to data structure 109 as a variant meme of root meme 115, e.g., based on determining a correspondence between meme 103 and root meme 115.

At 1212, the control circuitry may determine whether a popularity of the second meme (e.g., which may correspond to first meme 103 or which may correspond to root meme 115 or variant meme 125) exceeds a threshold. For example, the threshold may be a default threshold, or may be specific for certain memes or categories, or may be dynamically changed relative to a total number of interactions with memes in a particular category or across multiple categories in the data structure (e.g., data structure 109 of FIG. 1). The control circuitry may determine whether the second meme is sufficiently popular based on, for example, a number of times the second meme has posted or been reshared (e.g., on social media platform 104 and/or on other platforms) or viewed exceeds the threshold, by determining a number of electronic communications associated with the second meme, by determining whether one or more celebrities (e.g., a threshold number of celebrities) have posted the meme or its variants, by determining a number of times the meme has been recently posted (e.g., within the last 24 hours) exceeds a threshold, based on metadata of the meme, or based on any other suitable factors, or any suitable combination thereof. In some embodiments, popularity or virality data may be stored at data structure 109 of FIG. 1 and retrieved by the control circuitry. If a threshold is not met or exceeded, the process reverts to 1202.

If a threshold is met or exceeded, the process proceeds to 1216. At 1216, the control circuitry may, having determined that the popularity of the second meme exceeds a threshold, identify supplemental content related to a category, of the plurality of categories, of the first meme (e.g., meme 103 of FIG. 1) and/or the second meme (e.g., root meme 115 of FIG. 1). For example, the control circuitry may determine that metadata associated with category 108 of "working professionals" corresponds to metadata of supplemental content 112 related to an Office Depot advertisement. In some embodiments, the supplemental content may be identified based on having data or metadata matching a category of one of the first meme or second meme but not the other of the first meme or second meme, or based on having data or metadata that matches a greater number of categories associated with one of the first meme or second meme than a number of categories that match the other of the first meme or second meme. In some embodiments, the supplemental content from among a plurality of supplemental content items based on determining that the supplemental content depicts an object having a characteristic that matches the category of the first meme and/or the second meme.

At 1218, the control circuitry may cause supplemental content 112 to be provided for presentation in a vicinity of first meme 103 at the display of computing device 102. For example, the control circuitry may cause supplemental content 112 to replace (or be displayed in addition to) supplemental content 114 (e.g., related to farming equipment), which may not be sufficiently related to, or may be less relevant to, meme 103 and/or category 108 than supplemental content 112. In some embodiments, the supplemental content may be identified based at least in part on preferences of a user (e.g., user 102 of FIG. 1) accessing the platform that may be providing the first meme for display; e.g., once a category for the first and/or second meme is determined, the control circuitry may compute the impact of that category in relation to preferences of historical activity of the user's profile. In some embodiments, the control circuitry may identify a plurality of users of the social media platform having user preferences related to the category of first meme, causing the supplemental content to be provided for presentation in the vicinity of the first meme at the display of a plurality of computing devices of the plurality of users of the social media platform (e.g., simultaneously or at various times when such users are accessing the platform).

FIG. 13 is a flowchart 1300 of an illustrative process for updating a meme data structure, in accordance with some embodiments of this disclosure. In various embodiments, the individual steps of process 1300 may be implemented by one or more components of the devices, methods, and systems of FIGS. 1-12 and 14 and may be performed in combination with any of the other processes and aspects described herein. Although the present disclosure may describe certain steps of process 1300 (and of other processes described herein) as being implemented by certain components of the devices, methods, and systems of FIGS. 1-12 and 14, this is for purposes of illustration only, and it should be understood that other components of the devices, methods, and systems of FIGS. 1-12 and 14 may implement those steps instead.

At 1302, the control circuitry (e.g., control circuitry 904 of FIG. 9 and/or control circuitry 1011 of FIG. 10) may identify a particular image (e.g., an image corresponding to meme 103 of FIG. 1 identified for presentation) or may receive input of an image from a user via a user interface, or may otherwise identify an image as a candidate meme to be added to a meme data structure (e.g., data structure 109 of FIG. 1), such as, for example, based on determining the image has been frequently shared (e.g., a threshold number of times in a recent time frame) on a social media platform or any other suitable platform.

At 1304, the control circuitry may determine whether a threshold number of user-generated variations of the particular image exist (e.g., within data structure 109, on a particular social media platform, and/or across multiple platforms on the Internet). This may be a key factor as to whether an image can be considered a meme that has achieved a sufficient level of cultural significance to at least a particular subculture. To determine a value for the threshold number of user-generated variations, the control circuitry may determine how many user-generated variations exist for other memes (e.g., root meme 115 of FIG. 1) on a particular social media platform and/or other social media platforms, or a default value may be used.

In some embodiments, whether an image is a user-generated variation of the particular image may depend on whether a similarity score between the two images is above a threshold. For example, each of 404, 406, 408, 410, and 412 of FIG. 4 may be considered user-generated variants of 402 based on the control circuitry determining that 402 and each of 404, 406, 408, 410, and 412 share common attributes (e.g., baby making a first at a particular portion of the image) such that a similarity score between the images is above a threshold, despite each of 404, 406, 408, 410, and 412 having modifications of the baby, background and/or text in relation to 402.

At 1306, the control circuitry may, having determined that at least a threshold number of user-generated variations of the particular image exist, add data associated with the particular image (e.g., meme 103 or meme 115) to a meme data structure as a meme (e.g., as a root meme if no other similar memes are stored in the data structure, or as a variant meme if other memes are determined to be sufficiently similar). On the other hand, at 1308, the control circuitry may, having determined that at least a threshold number of user-generated variations of the particular image do not exist, refrain from adding data associated with the particular image to the meme data structure (e.g., data structure 109 of FIG. 1). This may conserve storage and/or processing resources, as there are a tremendous amount of images available on the Internet and social network platforms, and storing data associated with each image uploaded to a social media network in a meme database would be very storage-intensive.

FIG. 14 is a flowchart 1400 of an illustrative process for managing a meme data structure, in accordance with some embodiments of this disclosure. In various embodiments, the individual steps of process 1400 may be implemented by one or more components of the devices, methods, and systems of FIGS. 1-13 and may be performed in combination with any of the other processes and aspects described herein. Although the present disclosure may describe certain steps of process 1400 (and of other processes described herein) as being implemented by certain components of the devices, methods, and systems of FIGS. 1-13, this is for purposes of illustration only, and it should be understood that other components of the devices, methods, and systems of FIGS. 1-13 may implement those steps instead.

At 1402, the control circuitry (e.g., control circuitry 904 of FIG. 9 and/or control circuitry 1011 of FIG. 10) may access a meme data structure (e.g., data structure 109 of FIG. 1 and/or data structure 500 of FIG. 5). In some embodiments, such access may be automatic, e.g., based on a periodic or continuous database management schedule, or based on receiving user input.

At 1404, the control circuitry may determine an activity level of a root meme (e.g., root meme 502 and variant memes 504, 506, 508, 510, and 512) and the associated plurality of variant memes stored in the data structure. For example, the activity level may be determined based on one or more of recent posts, views, reshares or other interaction with the root meme and/or its variants on one or more platforms; whether variants have been created and added to the data structure within a threshold period of time from the current time; a popularity of one or more categories associated with the root meme and/or its variants and/or a popularity of the root meme and/or its variants; whether the root meme and/or its variants have been associated with a large amount of negative publicity; or based on any other suitable factors; or any combination thereof.

In some embodiments, data associated with the activity level may be stored in the meme data structure (e.g., data structure 109 of FIG. 1 and/or data structure 500 of FIG. 5) or a related database, or may be otherwise associated with the relevant memes. In some embodiments, the activity level of a meme may also include metadata that tracks the last time the meme was created, the last time the meme was posted, the number of variants associated with the meme, and/or any other suitable data.

At 1406, the control circuitry may determine whether the activity level associated with the root meme and/or its variants and determined at 1404 is below a threshold. For example, the threshold may be determined based thresholds of other popular memes in the data structure, and/or may be a default value or a dynamic value. If the activity level is below the threshold, processing may proceed to 1408; otherwise processing may proceed to 1410. In some embodiments, the control circuitry make take into account, at 1406, whether as a meme's variants mutate and nodes get farther and farther apart in the data structure, a subculture is becoming less popular or important to users, which may contribute to weighting or scoring in relation to the threshold.

At 1408, the control circuitry may delete the root meme and/or one or more of the associated plurality of variant memes from the data structure, as part of a database management effort. For example, if certain memes are outdated and/or not frequently posted or used, removal of such memes from the database conserves resources at the data structure, to help alleviate the burden of storing a vast number of memes and their associated variants available on the Internet, thereby conserving storage resources. For example, all data associated with the meme and/or its variants may be deleted, or certain branches or portions of the meme and/or its variants may be deleted (e.g., if nodes of such portions are moving farther apart, suggesting the subculture's strength is waning). In some embodiments, a user (e.g., an administrator) may be prompted with a message to confirm the deletion of such root meme and/or its variants, or the deletion may be performed automatically.

At 1410, the control circuitry may maintain data associated with the root meme and its variants in the data structure, based on determining that there is still a sufficient activity level associated with the meme to justify using resources to store data associated with the meme. In some embodiments, the metadata of the root meme and the associated plurality of variant memes is stored in the data structure. In some embodiments, a representation of the root meme and the associated plurality of variant memes is stored in the data structure. In some embodiments, the entire root meme and the associated plurality of variant memes is stored in the data structure.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
identifying a first meme for presentation at a display of a computing device;
generating a data structure comprising data associated with a plurality of memes, wherein the plurality of memes comprise a plurality of root memes, each respective root meme of the plurality of root memes being associated with a plurality of variant memes being variations of the respective root meme, and wherein the data indicates, for each respective meme of the plurality of memes, at least one category, of a plurality of categories, associated with visual content of the respective meme, and wherein the generating comprises:
    storing, as data of the data structure, an indication that a second meme of the plurality of memes belongs to a first category of the plurality of categories, based at least in part on using a first machine learning model to receive as input one or more tokens comprising one or more embeddings representing natural language descriptions associated with visual content of the second meme and to output data indicative of the first category, wherein the natural language descriptions associated with visual content of the second meme are generated using a second machine learning model; and
    learning, by the first machine learning model, that a first embedding representing at least a portion of the second meme based at least in part on the one or more natural language descriptions associated with the visual content of the second meme is highly determinative of categorization of memes into the first category, wherein the first embedding is one of a plurality of embeddings representing at least a portion of the second meme, and wherein the learning comprises training the first machine learning model using a subset of embedding data corresponding to memes of the plurality of memes previously categorized in the first category and calculating values indicative of an amount of alignment between embeddings and categorization into the first category;
determining that a category to which visual content of the first meme belongs corresponds to the first category of the second meme associated with the data stored in the data structure, wherein the determining comprises:
    extracting a second embedding representing at least a portion of the first meme, based at least in part on one or more natural language descriptions associated with visual content of the first meme generated using the second machine learning model;
    querying, via an application programing interface (API), the generated data structure with the extracted second embedding;
    determining, via an API returned result determined based at least in part on a comparison between the extracted second embedding and the first embedding representing at least a portion of the second meme learned to be highly correlated with categorization of memes into the first category, that the extracted second embedding representing the at least a portion of the first meme corresponds to the first category; and based at least in part on determining the extracted second embedding corresponds to the first category, assigning the first meme to the first category, without having to fully execute the first machine learning model to output an indication of a category to which the first meme belongs;
determining, based at least in part on a number of variant memes associated with the second meme in the data structure, whether a popularity of the second meme exceeds a threshold; and
in response to determining that the popularity of the second meme exceeds the threshold:
    identifying supplemental content related to the first category assigned to the first meme and the second meme; and
    causing the supplemental content to be provided for presentation in a vicinity of the first meme at the display of the computing device.

2. The method of claim 1, wherein determining that the category to which the visual content of the first meme corresponds to the first category of the second meme associated with the data stored in the data structure further comprises determining that the first meme is a variant meme of the second meme.

3. The method of claim 1, wherein a particular image and images associated with the particular image are added to the data structure as a root meme and variant memes, respectively, based on determining that the images associated with the particular image correspond to at least a threshold number of user-generated variations of the particular image.

4. The method of claim 1, further comprising:
determining a particular variant meme for a particular root meme stored in the data structure by:
    identifying a modified version of the particular root meme having a modification to at least one visual element of the particular root meme; and
    calculating a similarity score between the particular root meme and the modified version of the meme;
in response to determining that the similarity score is above a threshold, determining that the modified version of the particular root meme is a variant meme of the particular root meme; and
storing the particular variant meme in the data structure in association with the particular root meme.

5. The method of claim 1, wherein the data structure comprises a graph data structure, and a distance between a particular root meme and a particular variant meme of the plurality of memes in the graph data structure is indicative of a degree of similarity between a category of the particular root meme and a category of the particular variant meme.

6. The method of claim 5, wherein the graph data structure comprises a plurality of graph data structures, and wherein each respective category of the plurality of categories is associated with the respective graph data structure of the plurality of graph data structures that is organized based at least in part on popularities of memes associated with the respective category.

7. The method of claim 6, wherein identifying the supplemental content related to the first category assigned to the first meme and the second meme, and causing the supplemental content to be provided for presentation in the vicinity of the first meme at the display of the computing device, is further performed based at least in part on a distance between the graph data structure for the first category of the first meme and one or more other graph data structures, in the plurality of graph data structures, for one or more other categories of memes.

8. The method of claim 1, further comprising:

receiving an indication that the supplemental content should not be provided in association with a meme of a particular category; and wherein causing the supplemental content to be provided for presentation in the vicinity of the first meme at the display of the computing device is performed in response to determining that the first category of the first meme does not correspond to the particular category.

9. The method of claim 1, wherein a third meme is presented for display at the computing device, the method further comprises:

determining that a category to which visual content of the third meme does not belong corresponds to the first category of the visual content of the second meme associated with the data stored in the data structure, wherein the determining comprises:

extracting a third embedding representing at least a portion of the third meme, based at least in part on one or more natural language descriptions associated with visual content of the third meme;

querying, via the API, the data structure with the extracted third embedding;

determining, via a second API returned result, whether the extracted third embedding representing the at least a portion of the third meme corresponds to the first category; and based at least in part on determining the extracted embedding does not correspond to the first category based on the second API result, executing the first machine learning model to output an indication of a category to which the third meme belongs.

10. The method of claim 9, the method further comprising: training the first machine learning model to learn a plurality of embeddings for tokens associated with indications of characteristics of a dataset of memes, wherein the characteristics of the dataset of memes are obtained using the second machine learning model.

11. The method of claim 10, further comprising:

determining that a particular embedding, of the plurality of embeddings, for a particular token is used by the first machine learning model to output data indicative of the particular category; and based on determining that the particular embedding for the particular token is used by the first machine learning model to output data indicative of the particular category, using the particular token to identify one or more variant memes for one or more root memes.

12. The method of claim 10, further comprising:

using the first machine learning model to determine that the third meme is a variant meme of the first meme, and that the third meme belongs to a different category than the particular category of the first meme;

identifying a characteristic of the third meme that caused the third meme to be classified as belonging to the different category; and assigning, in the first machine learning model, a relatively higher weighting in association with an embedding for a token corresponding to the characteristic of the third meme.

13. The method of claim 1, wherein identifying the supplemental content related to the first category assigned to the first meme and the second meme comprises:

transmitting, to a server, an indication of the first category of the first meme; and receiving, from the server, the supplemental content, wherein the server identifies the supplemental content from among a plurality of supplemental content items based on determining that the supplemental content depicts an object having a characteristic that matches the first category of the first meme.

14. The method of claim 1, further comprising:

identifying a demographic group associated with the first meme;

identifying preferences of a user of the computing device;

determining, based on the preferences of the user, a particular demographic group, of a plurality of demographic groups, to which the user belongs;

determining the particular demographic group of the user corresponds to the demographic group associated with the first meme; and wherein causing the supplemental content to be provided for presentation in the vicinity of the first meme at the display of the computing device is performed in response to determining that the particular demographic group of the user corresponds to the demographic group associated with the first meme.

15. The method of claim 1, further comprising:

determining that an activity level associated with the root meme and the associated plurality of variant memes is below a threshold; and in response to determining that activity associated with the root meme and the associated plurality of variant memes is below the threshold, deleting the root meme and the associated plurality of variant memes from the data structure.

16. The method of claim 1, wherein the data structure comprising data associated with the plurality of memes further comprises data indicative of an activity level associated with the plurality of memes.

17. The method of claim 1, wherein the first meme is being displayed via a social media platform, and the method further comprises:

based on identifying a plurality of users of the social media platform having user preferences related to the first category of first meme, causing the supplemental content to be provided for presentation in the vicinity of the first meme at the display of a plurality of computing devices of the plurality of users of the social media platform.

18. The method of claim 1, wherein:

the data structure comprises a graph data structure, and a distance between a particular root meme and a particular variant meme of the plurality of memes in the graph data structure is indicative of a degree of similarity between a category of the particular root meme and a category of the particular variant meme; and the method further comprises determining a user's degree of association with a category based on a distance between a particular root meme and a particular variant meme of the plurality of memes indicated in the graph data structure.

19. A system comprising:

computer memory; and control circuitry configured to:

identify a first meme for presentation at a display of a computing device;

generate a data structure comprising data associated with a plurality of memes, wherein the plurality of memes comprise a plurality of root memes, each respective root meme of the plurality of root memes being associated with a plurality of variant memes being variations of the respective root meme, and wherein the data indicates, for each respective meme of the plurality of memes, at least one category, of a plurality of categories, associated with visual content of the respective meme, and wherein the generating comprises:

store, as data of the data structure, an indication that a second meme of the plurality of memes belongs to a first category of the plurality of categories, based at least in part on using a first machine learning model to receive as input one or more tokens comprising one or more embeddings representing natural language descriptions associated with visual content of the second meme and to output data indicative of the first category, wherein the natural language descriptions associated with visual content of the second meme are generated using a second machine learning model; and learn, by the first machine learning model, that a first embedding representing at least a portion of the second meme based at least in part on the one or more natural language descriptions associated with the visual content of the second meme is highly determinative of categorization of memes into the first category, wherein the first embedding is one of a plurality of embeddings representing at least a portion of the second meme, and wherein the learning comprises training the first machine learning model using a subset of embedding data corresponding to memes of the plurality of memes previously categorized in the first category and calculating values indicative of an amount of alignment between embeddings and categorization into the first category;

determine that a category to which visual content of the first meme belongs corresponds to the first category of the second meme associated with the data stored in the data structure, wherein the determining comprises:

extract a second embedding representing at least a portion of the first meme, based at least in part on one or more natural language descriptions associated with visual content of the first meme generated using the second machine learning model;

query, via an application programing interface (API), the generated data structure with the extracted second embedding;

determine, via an API returned result determined based at least in part on a comparison between the extracted second embedding and the first embedding representing at least a portion of the second meme learned to be highly correlated with categorization of memes into the first category, that the extracted second embedding representing the at least a portion of the first meme corresponds to the first category; and based at least in part on determining the extracted second embedding corresponds to the first category, assign the first meme to the first category, without having to fully execute the first machine learning model to output an indication of a category to which the first meme belongs;

determine, based at least in part on a number of variant memes associated with the second meme in the data structure, whether a popularity of the second meme exceeds a threshold; and in response to determining that the popularity of the second meme exceeds the threshold:

identify supplemental content related to the first category assigned to the first meme and the second meme; and cause the supplemental content to be provided for presentation in a vicinity of the first meme at the display of the computing device.

20. The system of claim 19, wherein the control circuitry is configured to determine that the category to which the visual content of the first meme corresponds to the first category of the second meme associated with the data stored in the data structure by determining that the first meme is a variant meme of the second meme.

* * * * *